(12) United States Patent
Farley

(10) Patent No.: US 12,085,217 B2
(45) Date of Patent: Sep. 10, 2024

(54) HOLDER AND METHOD FOR HOLDING AN OBJECT

(71) Applicant: Fluke Corporation, Everett, WA (US)

(72) Inventor: David W. Farley, Orem, UT (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 18/065,556

(22) Filed: Dec. 13, 2022

(65) Prior Publication Data
US 2023/0375125 A1    Nov. 23, 2023

Related U.S. Application Data

(60) Provisional application No. 63/343,711, filed on May 19, 2022.

(51) Int. Cl.
*F16M 11/04*    (2006.01)

(52) U.S. Cl.
CPC ......... *F16M 11/041* (2013.01); *F16M 11/045* (2013.01); *F16M 11/046* (2013.01); *F16M 2200/027* (2013.01)

(58) Field of Classification Search
CPC .. F16M 11/041; F16M 11/045; F16M 11/046; F16M 2200/027
USPC ............ 248/125.1, 176.1, 230.3, 230.1, 161, 248/230.2, 316.4, 575; 24/115 G, 136 R, 24/600.6, 656, 613; 267/177, 179
See application file for complete search history.

(56) References Cited

U.S. PATENT DOCUMENTS

| | | | | |
|---|---|---|---|---|
| 345,923 A * | 7/1886 | Riggle | ................... | F16B 45/049 24/165 |
| 1,438,264 A * | 12/1922 | Rygh | ................... | A44C 5/2028 24/116 R |
| 2,482,625 A * | 9/1949 | Kunkel | ................. | F16B 45/051 24/523 |
| 3,227,496 A * | 1/1966 | Johnson | ................... | B25G 3/12 15/151 |
| 3,271,510 A * | 9/1966 | Decker | ................... | F16G 11/00 24/600.6 |

(Continued)

FOREIGN PATENT DOCUMENTS

| | | |
|---|---|---|
| FR | 405741 A | 1/1910 |
| JP | 55-133236 U | 9/1980 |

OTHER PUBLICATIONS

Extended European Search Report for Application No. 23174136.4 dated Dec. 12, 2023, 7 pages.

*Primary Examiner* — Christopher Garft
(74) *Attorney, Agent, or Firm* — Seed IP Law Group LLP

(57) ABSTRACT

A holder secured to a vertical column by a cross support holds an object in a fixed position. The holder includes a tube that can be secured to the cross support. A movable clip at a first end of the tube is configured to hold the object, e.g., a probe held in a calibration bath. The movable clip includes an aperture. When the movable clip is in an extended position, an object can be inserted into the aperture. When the movable clip moves toward a retracted position, the object is held within the aperture. A cap at the second end of the tube is coupled to the movable clip by a spring inside the tube. The movable clip exerts an adjustable holding force on the object by adjusting a number of turns of the spring between the cap and the movable clip. A central holding device may support multiple holders.

20 Claims, 14 Drawing Sheets

(56) References Cited

U.S. PATENT DOCUMENTS

| | | | | |
|---|---|---|---|---|
| 3,362,050 | A | * | 1/1968 | McCarthy ............ F16B 45/049 |
| | | | | 403/325 |
| 3,823,971 | A | | 7/1974 | Golden |
| 4,867,404 | A | * | 9/1989 | Harrington ............ A61B 17/02 |
| | | | | 248/316.4 |
| 6,860,877 | B1 | * | 3/2005 | Sanchez ................ A61B 17/12 |
| | | | | 606/1 |
| 7,021,592 | B2 | * | 4/2006 | Brandes ................ F16M 11/14 |
| | | | | 248/188.7 |
| 2001/0054335 | A1 | | 12/2001 | Harman |
| 2005/0189153 | A1 | | 9/2005 | Yang |
| 2005/0258582 | A1 | * | 11/2005 | Chou ..................... F16F 1/125 |
| | | | | 267/177 |
| 2007/0113381 | A1 | | 5/2007 | Rustad |

* cited by examiner

HOLDER AND METHOD FOR HOLDING AN OBJECT

BACKGROUND

Technical Field

The present disclosure is directed to a holder configured to hold a probe or other object, as well as a calibration bath with the holder. The holder can be mounted on the calibration bath, for example, to hold a probe inside the calibration bath. The present disclosure is further directed to apparatus and systems configured to support multiple holders.

Description of the Related Art

Generally, holding structures can be designed with adjustable and movable components to hold a variety of objects with different dimensions and weights. A holding structure may include components that allow a holder to be adjusted in three dimensions, e.g., vertically, horizontally, and rotationally. For instance, a holding structure can include a standing column to be fixed to a reference point such as a table, ground, or an instrument body. The standing column may include stand legs that help position the standing column on a surface.

A holder clip can be attached to the standing column. The holder clip may include an adjustable opening to hold objects having different dimensions. Conventionally, a dimension of the opening is adjustable with a fastener. In addition, the fastener can determine a holding force that the holder clip exerts on the object inside the opening. For instance, an operator can twist the fastener of the holder clip to apply increasing force on the object or to release the object from the opening. In all of these arrangements, conventional holding structures require the operator to use two hands: one hand to secure the holder and another hand to twist the fastener to adjust the holding force on the object in the opening of the holder.

BRIEF SUMMARY

The present disclosure is directed to a holding apparatus, system, holder, and method for holding an object, such as a measurement probe, in a fixed position relative to an instrument, such as a calibration instrument. In at least one embodiment, a holder is secured by a cross support to a vertical column. Vertical and horizontal positions of the holder can be adjusted by adjusting the cross support.

The holder includes a tube that can be secured to the cross support. A movable clip attached to a first end of the tube is configured to hold an object in a fixed position. The movable clip includes an aperture into which the object can be inserted and be held by the holder. A holding force that the movable clip exerts on the object in the aperture can be adjusted by moving a cap attached to the tube, e.g., at a second end of the tube.

In at least one embodiment, the cap is coupled to the movable clip by a spring inside the tube. The spring may be a helical coil that is coupled to the movable clip by a first retainer and is coupled to the cap by a second retainer. The first retainer allows axial movement of the movable clip along a longitudinal axis of the tube. The axial movement of the movable clip can be limited by one or more grooves on the movable clip and/or the tube. The holding force of the movable clip can be adjusted by changing the number of turns of the helical coil retained by the first and/or second retainer. A rotational movement of the cap and/or helical coil can move a tooth of the first and/or second retainer between adjacent turns of the helical coil to reduce or increase the number of turns of the helical coil retained by the first and/or second retainer, and consequently adjust the spring force that the spring exerts on the movable clip.

The aperture of the movable clip is shaped to allow different objects having different dimensions to be held within the aperture. The size of the aperture is variable to accommodate the dimension of the object to be held. With a single hand, an operator can grasp the tube and move the movable clip axially outward to open the aperture, allowing an object to be inserted inside the aperture. Moving the movable clip outward extends the spring inside the tube. Afterward, the operator can release the movable clip to hold the object inside the aperture by retraction of the spring, wherein the object is held between an outer end of the movable clip and an end of the tube. Thus, there is no need for the operator to use a separate hand to adjust the size of the aperture to hold objects of different dimensions. Moreover, the holding force that the movable clip exerts on the object is variable according to adjustment of the number of turns of the spring that is retained by either of the first and/or second retainers. The holding system can be used in various applications such as with measurement instruments, e.g., a calibrator having a calibration bath. The object held by the holder can be a measurement probe to be positioned in an environment and measure a characteristic of the environment. For instance, the characteristic may include temperature, pressure, humidity, vibration, density, or viscosity, or a combination thereof. The aperture may have an inner surface shaped to direct the measurement probe to a consistent position within the aperture when the measurement probe is inserted into and held within the aperture.

Also disclosed herein are embodiments of an apparatus for holding a plurality of objects such as, for example, measurement probes. The apparatus includes a central holding device to which a plurality of holders, e.g., as described above, can be simultaneously coupled. Each holder may include, for example, a tube, a movable clip at an end of the tube, and a spring inside the tube. The movable clip has an aperture through which an object can be inserted and held within the aperture, while a spring force of the spring on the movable clip is adjustable to hold the object within the aperture of the movable clip.

Embodiments of a system for holding a plurality of objects, such as a plurality of measurement probes for calibration, may include a supporting structure having a vertical column attachable to another object such as a calibration instrument (e.g., calibration bath). A cross support is movable along the vertical column and securable to the vertical column. A horizontal column is securable to the vertical column by the cross support, and to a central holding device. The cross support provides vertical and horizontal positioning of the horizontal column relative to the calibration instrument. The central holding device includes one or more vertically-oriented apertures, while a periphery of the central holding device includes a plurality of horizontally-oriented coupling apertures. The horizontal column is coupled to the central holding device, e.g., to support the central holding device relative to the calibration instrument.

BRIEF DESCRIPTION OF THE SEVERAL VIEWS OF THE DRAWINGS

Aspects of the present disclosure are best understood from the following detailed description when read with the accompanying figures. It is noted that various features are not necessarily drawn to scale.

DETAILED DESCRIPTION

Figure 1A:
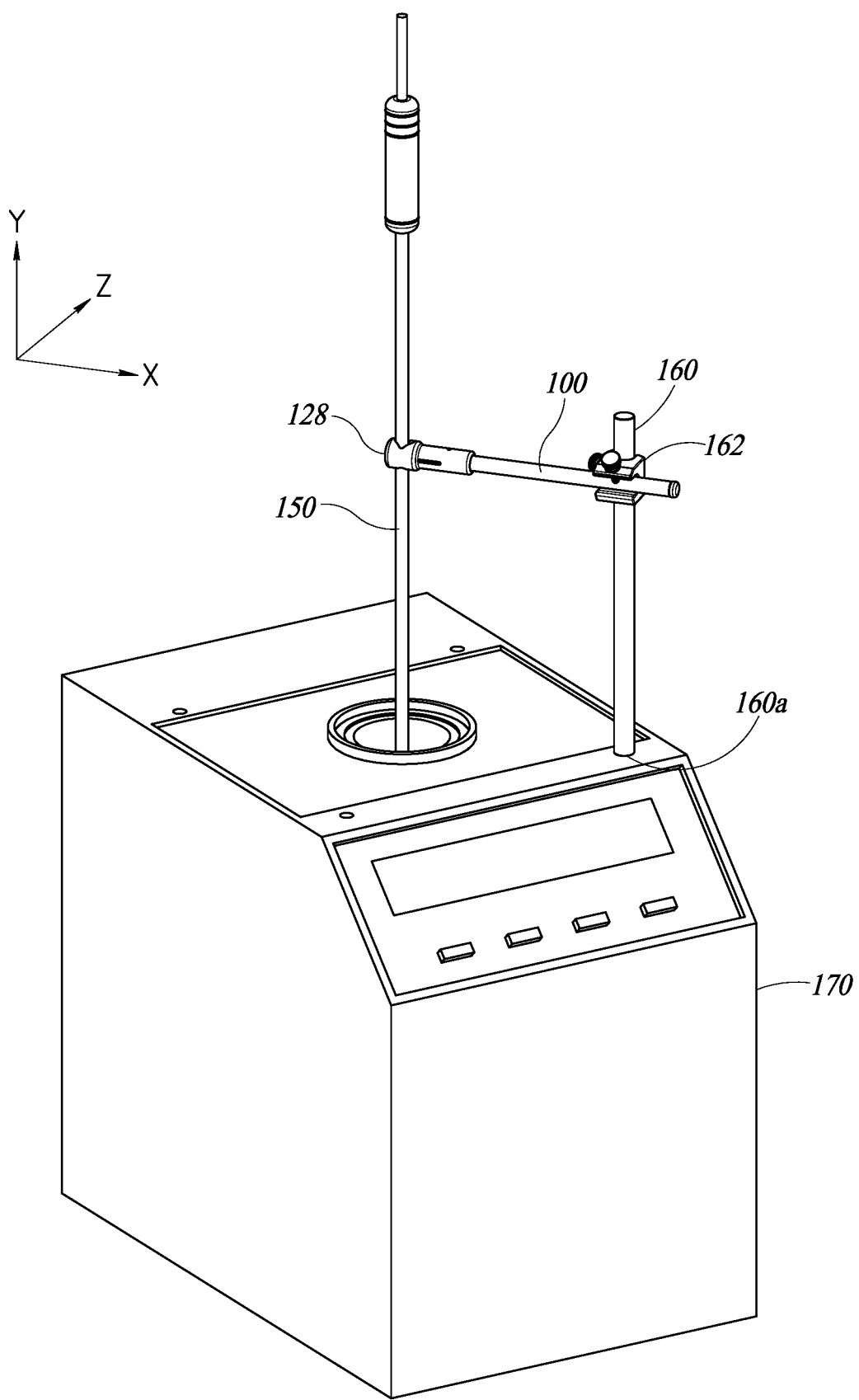
FIG. 1A depicts a holding system configured to hold an object such as a probe, in accordance with one or more embodiments of the present disclosure.

Various embodiments of a holding apparatus, system, holder, and method disclosed herein enable an object, such as a measurement probe, to be held in a fixed position relative to another object, such as a calibration instrument. Advantageously, a user (or operator) of the holder is able to operate the holder using a single hand. In at least one embodiment of the holder, a movable clip at a first end of a tube is connected by a spring inside the tube to a cap at a second end of the tube. The operator can grasp the tube and push the movable clip axially outward along the tube to open an aperture in the movable clip, allowing an object to be inserted inside the aperture. The operator can then release the movable clip and a spring force of the spring pulls the movable clip back toward the first end of the tube. An object is held inside the aperture between the first end of the tube and an inner surface of the aperture at the outer end of the movable clip.

The amount of spring force exerted by the spring on the movable clip is adjustable, thereby allowing adjustment of the amount of holding force that the movable clip exerts on the object being held in the aperture. Increasing or decreasing the amount of holding force that the movable clip exerts on the object increases or decreases a frictional force exerted on the object by the movable clip and the first end of the tube. In various embodiments, the holding force can be dynamically adjusted for holding each object or be adjusted only at the beginning of a specific operation based on a characteristic of the objects to be held by the holder during the specific operation. Once the holding force is set, the same holding force will be exerted on each object of the same size that is placed into the aperture of the holder.

The spring may be a helical coil that couples the movable clip to the cap using first and second retainers that are coupled to the ends of the spring. The spring force exerted by the spring on of the movable clip is adjustable by changing a number of turns of the helical coil that are retained by the first and/or second retainer. The first and/or second retainer may have a tooth that extends between adjacent turns of the helical coil. Rotational movement of the cap and/or helical coil can move the tooth along the turns of the helical coil to increase or reduce the number of turns of the helical coil retained by the first and/or second retainer, which consequently adjusts the spring force that the spring exerts on the movable clip.

Furthermore, the aperture of the movable clip may advantageously be shaped to allow different objects having different dimensions to be held at a consistent position within the aperture. An inner surface of the aperture is shaped to direct an object, such as a measurement probe, to a consistent position within the aperture when the object is inserted into and held within the aperture. The holding system can be used in various applications such as with measurement instruments, e.g., a calibrator having a calibration bath, to hold a measurement probe that measures an environmental characteristic such as temperature.

FIG. 1A is a perspective view of a holding system configured to hold a measurement probe 150 in a fixed position. The holding system can be used in various applications, such as with a measurement instrument with a calibration bath 170. The measurement probe 150 may be a measurement tool to be positioned in an environment and measure a characteristic of the environment (e.g., fluid in the calibration bath 170). For instance, the characteristic may include temperature, pressure, humidity, vibration, density, or viscosity, or a combination thereof. In various embodiments, the holding system may be used to hold objects other than the measurement probe 150.

Figure 1B:
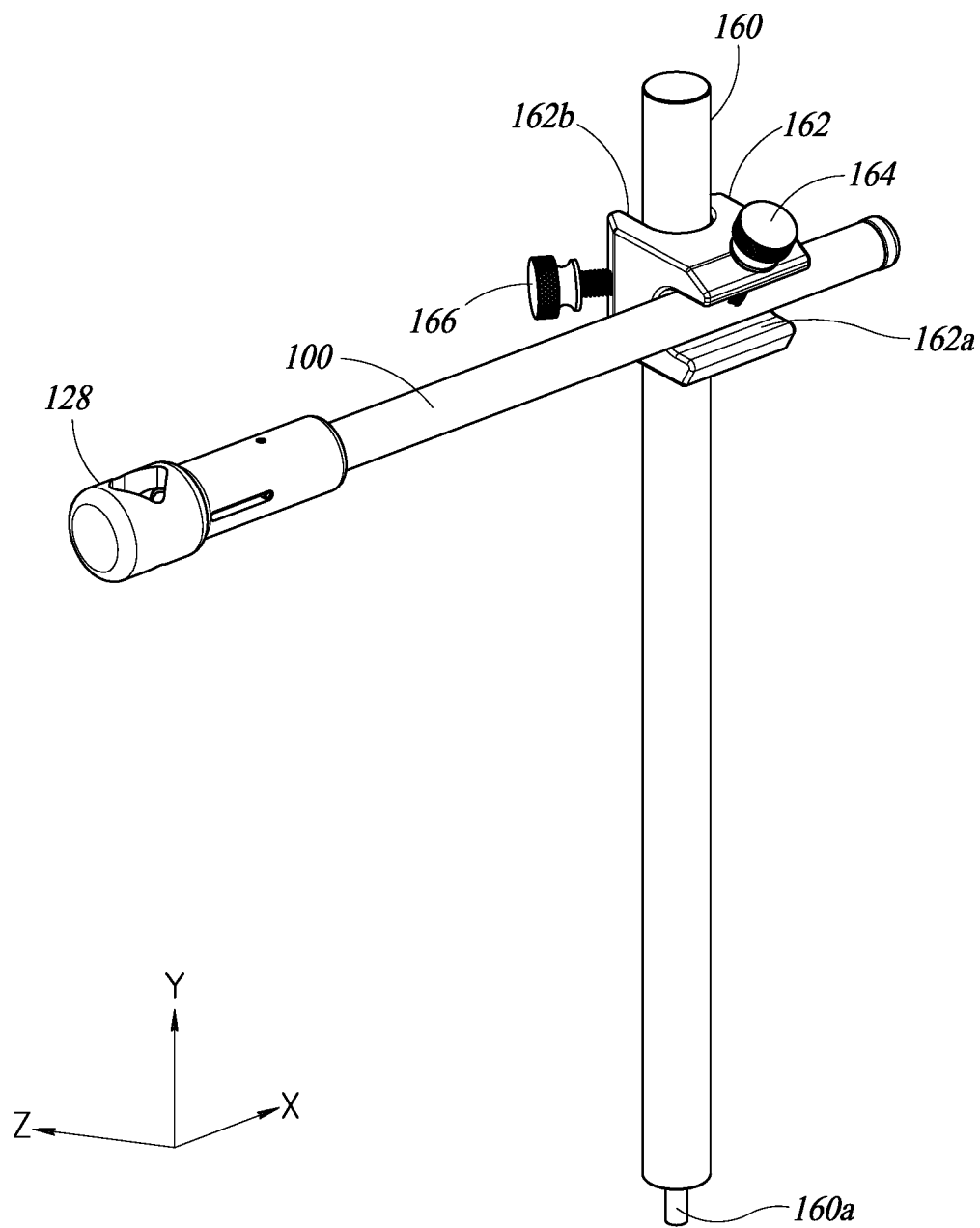
FIG. 1B provides a detailed view of the holding system shown in FIG. 1A, in accordance with one or more embodiments.

In some embodiments, the holding system includes a holder 100, a vertical column 160, and a cross support 162 that couples the holder 100 to the vertical column 160. The holder 100 is configured to hold a measurement probe 150 or other objects that are selectively inserted through an aperture 128 in the holder 100. A dimension of the aperture 128 is automatically adjusted based on a dimension of the inserted object. A vertical position of the holder 100 along a y axis, and horizontal positions of the holder 100 along x and z axes, can be adjusted using the cross support 162. The vertical column 160 may be fixed in a position relative to an instrument that is operated in connection with the measurement probe 150. In some examples, the vertical column 160 is a pillar column having an end 160a that is attachable to an instrument or a stand. In this fashion, the end 160a may include an axially-extending pin to be inserted into the instrument or stand (as depicted in FIG. 1B). The stand can be mounted on or adjacent to a surface of the instrument, such as the calibration bath 170 shown in FIG. 1A. In addition or alternatively, the pin may be inserted to a clip that can be fastened to components of the instrument or stand. A material of the vertical column 160 can be low-conductive or an insulator with respect to electrical and/or thermal energy flows. In some examples, the material of the vertical column 160 can be stainless steel. In some examples, the material of the holder 100 can be same as the material of the vertical column 160. Using a low-conductive material allows the holder 100 to hold a high temperature measurement probe 150 in a high temperature environment.

FIG. 1B is a perspective view that includes more detail of the holding system shown in FIG. 1A. As described above, the cross support 162 secures the holder 100 to the vertical column 160. The cross support 162 is vertically movable along the vertical column 160 to adjust a vertical position of the holder 100 in the y axis. In addition, the cross support 162 is rotationally movable around the vertical column 160 to adjust a horizontal position of the holder 100 in a plane of x and z axes. The cross support 162 includes a first opening 162a, a second opening 162b, a first screw 164, and a second screw 166. The holder 100 can axially be inserted into the first opening 162a. A dimension of the first opening 162a is adjustable by the first screw 164.

A length of the holder 100 can be designed based on the application of the holder 100. For example, the length of the holder 100 can be longer if the holder 100 is designed to be used in a toxic or high-temperature environment. An effective length of the holder 100 can be defined as a horizontal distance between the vertical column 160 and the aperture 128. The effective length of the holder 100 is adjustable by axial movement of the holder 100 inside the first opening 162a. In this fashion, rotation of the first screw 164 can open the first opening 162a for the axial movement of the holder 100. When the effective length of the holder 100 is adjusted to a desired length, rotation of the first screw 164 can secure the holder 100 inside the first opening 162a.

In a similar fashion, the vertical column 160 can vertically move inside the second opening 162b. Rotation of the second screw can open the opening 162 for the vertical movement of the vertical column 160 inside the second opening 162b. When a vertical position of the cross support 162, and consequently the holder 100, relative to the vertical column 160 is adjusted to a desired position, rotation of the second screw 166 can secure the vertical column 160 inside the second opening 162b at the desired position. A material of the cross support 162 can be the same as or different than the material of the holder 100 and the material of the vertical column 160. In some examples, maximum and minimum horizontal movement limits of the holder 100 inside the first opening 162a may be indicated by visible signs on the holder 100. The maximum and minimum horizontal movement limits may be determined based on the strength of the first screw 164 and the design of the first opening 162a. In a similar fashion, maximum and minimum vertical movement limits of the vertical column 160 inside the second opening 162b may be indicated by visible signs on the vertical column 160. The maximum and minimum vertical movement limits may be determined based on the strength of the second screw 166 and the design of the second opening 162b.

The second screw 166 and the second opening 162b provide a freedom for movement of the cross support 162 around and along the vertical column 160. Rotation of the second screw 166 can release a force exerted by the second screw 166 on the vertical column 160, after which the cross support 162 can rotate around and move up and down the vertical column 160. Once the cross support 162 is positioned as desired, rotation of the second screw 166 can secure the cross support 162 to the vertical column 160 in the desired position. In a similar fashion, the first screw 164 and the first opening 162a provide a freedom for rotational and axial movement of the holder 100 inside the first opening 162a. Rotation of the first screw 164 can release a force exerted by the first screw 164 on the holder 100, after which the holder 100 can rotate inside and move axially within the first opening 162a. Once the holder 100 is positioned as desired, rotation of the first screw 164 can secure the holder 100 in the desired position.

Figure 2A:
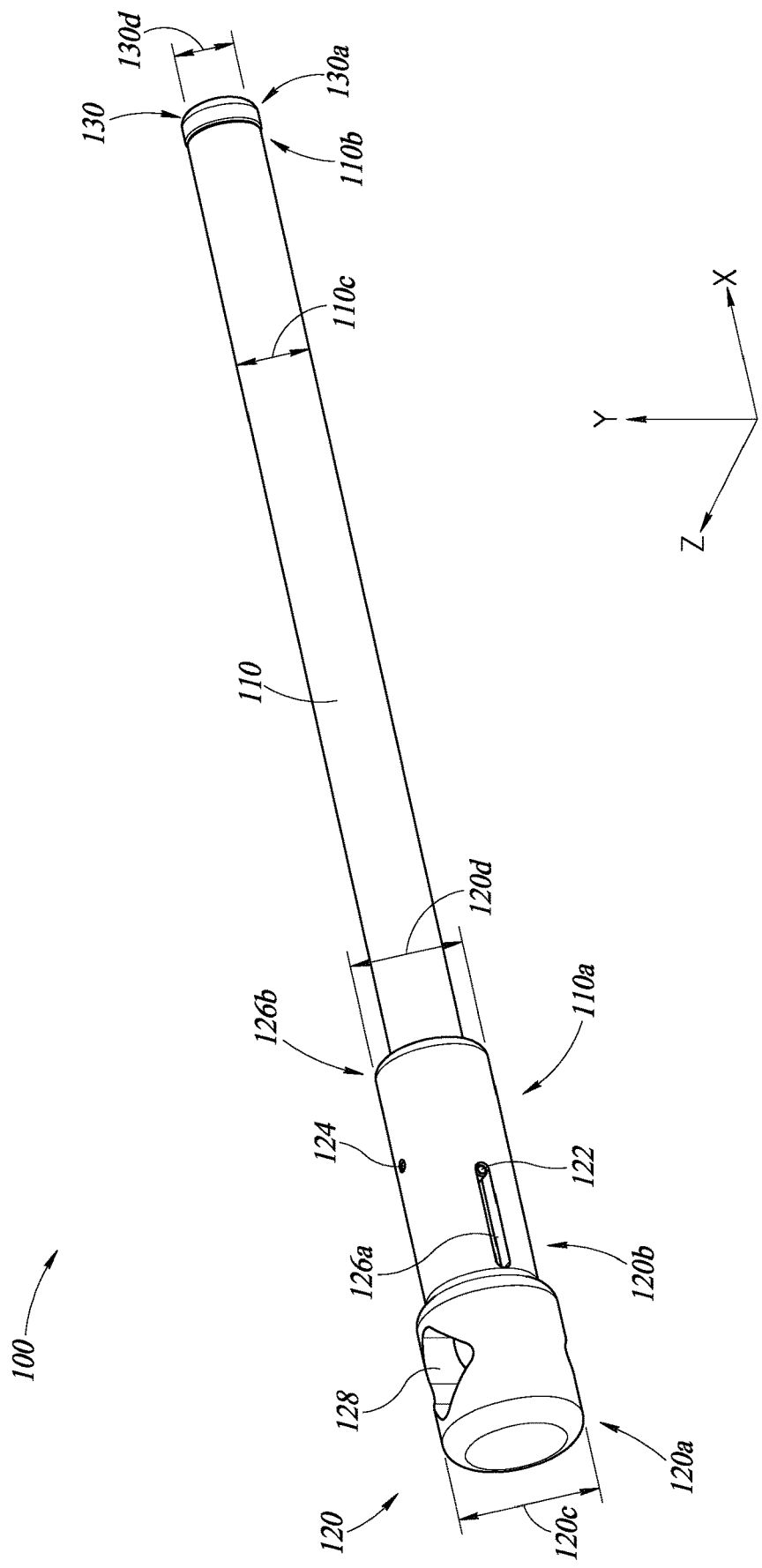
FIG. 2A depicts a holder of the holding system shown in FIG. 1A, in accordance with one or more embodiments.

FIG. 2A depicts the holder 100 of the holding system illustrated and described in FIGS. 1A and 1B. The holder 100 includes a tube 110, a movable clip 120, and a cap 130. The tube 110 has an elongate shape with a first end 110a and a second end 110b. The movable clip 120 is attached at the first end 110a and the cap 130 is attached at the second end 130. In various embodiments, a material of the tube 110 may be same as or different than the material of the vertical column 160 shown in FIGS. 1A and 1B. A material of the movable clip 120 may be same as or different than a material of the cap 130. In some examples, the material of the movable clip 120 and the cap 130 are same as the material of the vertical column 160.

In various embodiments, the tube 110 has a circular cross-sectional shape with an outer diameter 110c. The outer diameter 110c may be consistent along the tube 110. The movable clip 120 includes a first portion 120a and a second portion 120b. The first portion 120a has an outer diameter 120c and the second portion 120b has an outer diameter 120d. In the illustrated embodiment, the diameter 120c is greater than the diameter 120d. The diameter 120d is greater than the outer diameter 110c, such that the movable clip 120 is able to axially slide over an outer surface of the tube 110. By configuring the diameter 120c to be greater than the diameter 120d, the aperture 128 has a larger surface area to be in contact with an object inserted into the aperture 128. The greater contact surface increases the stability of the object when the object is held by the holder 100.

Figure 2B:
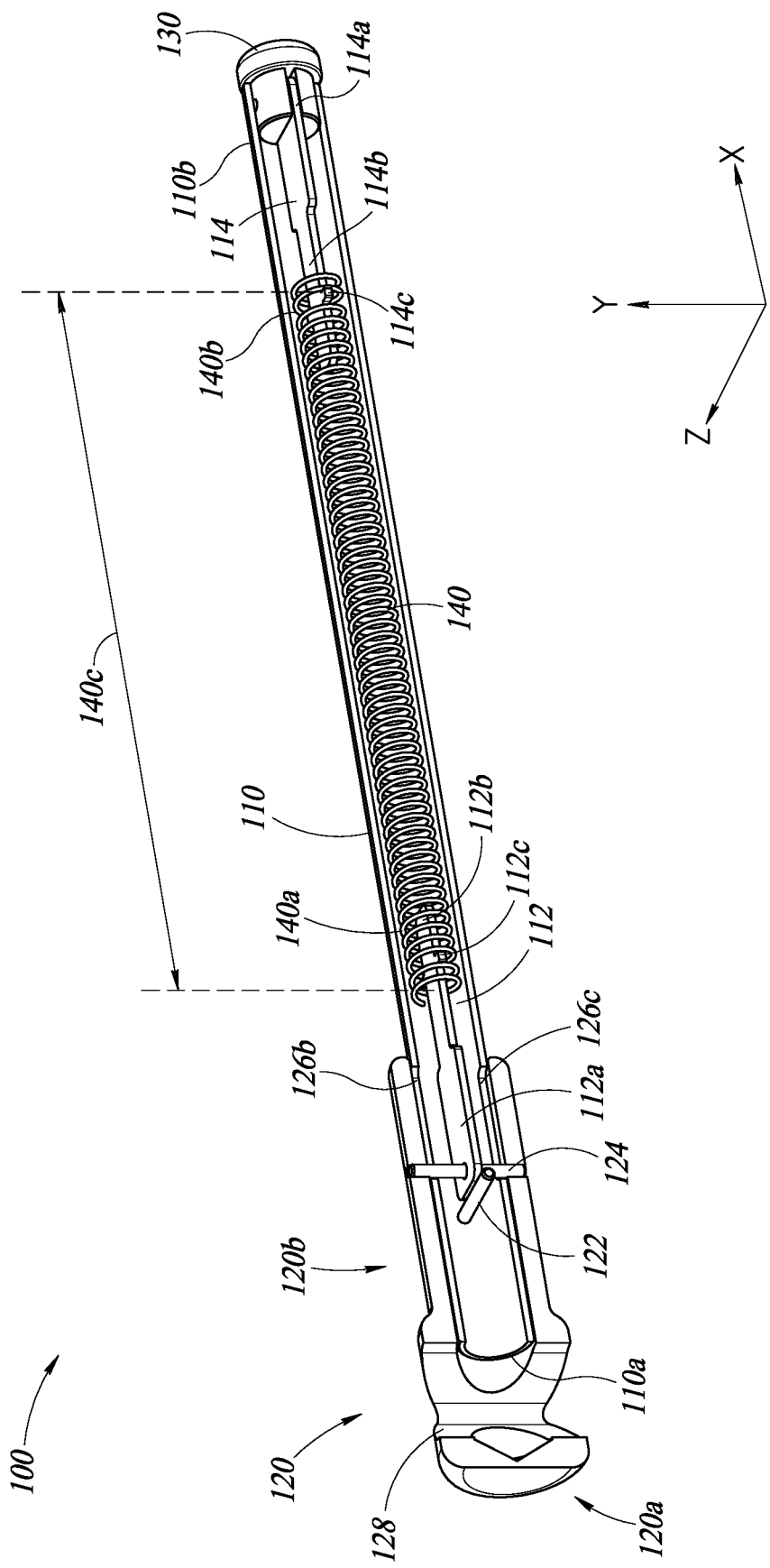
FIG. 2B is a cross-sectional view of the holder shown in FIG. 2A, in accordance with one or more embodiments.
Figure 3A:
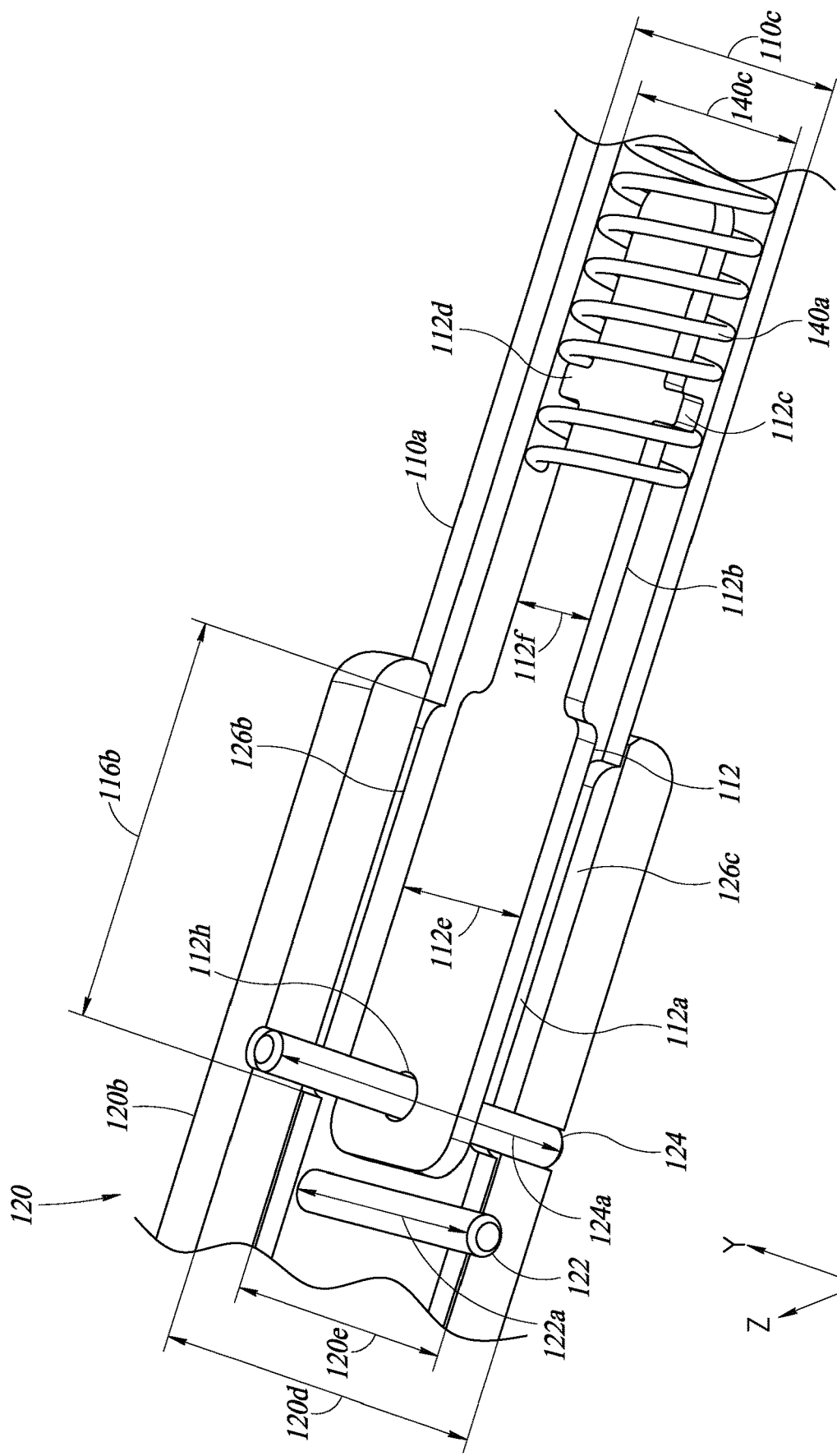
FIG. 3A provides a detailed view of a first end of the holder shown in FIG. 2B, in accordance with one or more embodiments.

The second portion 120b of the movable clip 120 has a first groove 126a that guides the axial movement of the movable clip 120 along the tube 110 and defines the limits of axial movement of the movable clip 120. A first pin 122 coupled to the tube 110 extends outwardly into the first groove 126a and travels within the first groove 126a when the movable clip 120 is extended and retracted along the tube 110. A second pin 124 coupled to the movable clip 120 extends inwardly into a second groove 126b defined in the tube 110. The second groove 126b is hidden under the second portion 120b of the movable clip 120, but is shown in FIGS. 2B and 3A and described in further detail below. In some embodiments, only a single pin (e.g., the first pin 122 or the second pin 124) and a single groove (e.g., the first groove 126a or the second groove 126b) may be used to control the axial movement of the movable clip 120.

The cap 130 may be broadly considered as a structure having any dimension or shape provided the cap 130 has an outer portion 130a with an outer diameter 130d (i.e., an outer width) that is greater than the inner diameter 110c of the tube 110. The cap 130 is thus retained outside the tube 110. The cap 130 has a smaller inner portion 130b (see FIG. 4) that extends inside the second end 110b of the tube 110. As will be understood from the description below, the outer portion 130a of the cap 130 can be moved (e.g., rotated) to adjust a spring force of a spring 140 inside the tube 110 that is exerted on the movable clip 120 and thus exerted by the movable clip 120 on an object inserted into the aperture 128. In addition, the outer portion 130a allows an operator of the holder 110 to pull the cap outward from the second end 110b of the tube 110 to access the spring 140. Using the cap 130 at the second end 110b of the tube 110 to adjust the spring force of the spring 140, as described herein, is beneficial in that it allows the operator to adjust the holding force that the movable clip exerts on an object in the aperture 128 without requiring the operator to remove the movable clip 120 from the first end 110a of the tube 110. For instance, if the holder 100 is being used to hold a probe in a high temperature calibration bath (e.g., the calibration bath 170 in FIG. 1A) or in a toxic environment, access to the first end 110a of the tube 110 which is closer to the probe and the dangerous environment may be precluded. With the holder 100 constructed as described herein, an operator can adjust the holding force of the movable clip 120 from the second end 110b of the tube 110 without needing to touch the probe or the first end 110a of the tube 110. In various embodiments, the spring force (and thereby the holding force) of the holder 100 can be dynamically adjusted each time an object is placed into the holder, or the spring force may be adjusted only once at the beginning of a specific operation based on a characteristic of a group of objects to be held by the holder 100 during the course of the specific operation. In this fashion, once the spring force is adjusted (e.g., according to an average or a maximum weight, dimension, or material of the objects, for example), the holder 100 consistently exerts the same holding force on each of the objects to hold the objects inserted into the aperture 128, until the spring force of the spring 140 is again adjusted.

In some examples, the spring force of the spring 140, and thus holding force of the movable clip 120, may be adjusted by an automatic control system instead of the operator. In such examples, the spring force can be detected by a sensor, e.g., a sensor positioned inside the tube 110 or inside the first groove 126a. The sensor may be a mechanical force sensor of any type, such as a load cell, a strain gauge, or a force sensing resistor. A signal from the sensor indicative of the spring force of the spring 140 can be transmitted to a controller. The controller may control a mechanical movement to be applied to the spring 140 or to the cap 130. For instance, the mechanical movement can be applied by a stepper motor. The controller may generate a control signal based on the indicated spring force and send the control signal to the stepper motor. The controller may be programmed with an executable program to generate a minimum and/or a maximum amount of spring force based on a weight and dimensions of an object to be held by the holder 100. The controller compares the indicated spring force with the minimum and/or maximum thresholds, and when the controller detects the spring force of the spring 140 is lower than a minimum threshold, the control signal can actuate a movement of the cap 130 by the stepper motor in a direction that increases the spring force. In a similar fashion, when the controller detects the spring force is higher than a threshold, the control signal can actuate a movement of the cap 130 by the stepper motor in a direction that decreases the spring force. This control system allows an automated, precise adjustment of the spring force, while an operator only need insert the object into the aperture 128 of the holder and possibly enter the weight and/or dimension of the object into the controller. Alternatively, the weight and/or dimension of the object may be automatically detected by one or more sensors coupled to the holder 100, e.g., to detect the size of the aperture 128, and thus the object, after the movable clip 120 is released and/or detect insufficient frictional force of the moveable clip 120 on the object to hold the object in the aperture 128. The one or more sensors may automatically communicate detected weight and/or dimension data to the controller.

FIG. 2B is a cross-sectional view of the holder 100 shown in FIG. 2A, illustrating the inside of the holder 100 in greater detail. In this figure, a cross-sectional cut is removed from the tube 110 and the movable clip 120 to schematically illustrate internal components of the holder 100. Relative dimensions of the components shown in the FIG. 2B may be different for different embodiments of the disclosure. The internal components of the holder 100, as shown, includes a first retainer 112, a second retainer 114, and a spring 140. As described above, a portion of cap 130, a portion of the first pin 122 and a portion of the second pin 124 are also inside the tube 110.

In FIG. 2B, the second groove 126b in the tube 110 is visible while the first groove 126a in the movable clip 120 is not shown. As described above, the second pin 124 is coupled to the movable clip 120 and extends through the second groove 126b in the tube 110. Inside the tube 110, the second pin 124 passes through a first portion 112a of the first retainer 112. Thus, the second pin 124 couples the first retainer 112 to the movable clip 120. A second portion 112b of the first retainer 112 is coupled to a first end 140a of the spring 140. The first retainer 112 translates a spring force of the spring 140 to the movable clip 120 by the second pin 124. A maximum and minimum axial movement of the first retainer 112, and thus the movable clip 120, is defined by the length of the second groove 126b. In some examples, the holder 100 can be symmetrical across the x axis. In this fashion, the tube 110 includes a third groove 126c defined opposite to the second groove 126b. The second pin 124 may extend through the third groove 126c into the movable clip 120, thus coupling the first retainer 112 to both an upper portion and a lower portion of the movable clip 120 in the y axis. Coupling the second pin 124 through the two grooves 126b, 126c, to the movable clip 120 can increase the stability of the axial movement of the movable clip 120 and the first retainer 112.

As illustrated, the spring 140 may be a helical coil. The spring force applied by the spring 140 to the movable clip 120, and thus the holding force applied by the movable clip to an object in the aperture 128, may be adjusted by adjusting an effective length of the spring 140 (number of turns of the helical coil) connecting the movable clip 120 to the cap 130. Changing the number of turns of the helical coil of the spring 140 that connect the movable clip 120 to the cap 130 increases or decreases the effective length of the spring 140, and thus the spring force of the spring 140. For instance, reducing the number of turns of the helical coil in a fixed length of the tube 110 results in an extension of the spring 140 that increases the axial spring force exerted by the spring 140. In contrast, increasing the number of turns of the helical coil in the same fixed length of the tube 110 decreases the axial spring force exerted by the spring 140. Adjusting the spring force of the spring 140 changes the holding force of the movable clip 120, and thus the holder 100, for holding different objects with different weights and dimensions. To hold a heavier object in a stable position, an increase holding force can be applied by the spring 140 to increase the friction on the object by the movable clip 120 and the first end of the tube 110a.

The first end 140a of the spring 140 is retained by the second portion 112b of the first retainer 112. A second end 140b of the spring 140 is retained by a second end 114b of the second retainer 114. The second retainer 114 includes a first end 114a that is coupled to the cap 130. The first retainer 112 is positioned toward the first end 110a of the tube 110 and the second retainer is positioned toward the second end 110b of the tube 110. In various embodiments, the second end 112b of the first retainer 112 includes a first tooth 112c that extends outward between adjacent turns of the helical coil at the first end 140a of the spring 140. In a similar fashion, the second end 114b of the second retainer 114 includes a second tooth 114c that extends outward between adjacent turns of the helical coil at the second end 140b of the spring 140. In some embodiments, the first retainer 112 can have a same structure and be constructed of a same material as the second retainer 114. An effective length of the spring 140 can be defined as a fixed distance between the first tooth 112c of the first retainer 112 and the second tooth 114c of the second retainer 114. Hence, the spring force of the spring 140 can be adjusted by changing the number of turns of the helical coil of the spring 140 in the effective length of the spring 140.

In various embodiments, the number of turns in the effective length of the spring 140 can be changed by rotational movement of the cap 130, which translates to rotational movement of the second retainer 114. By rotating the second retainer 114, the second tooth 114c can travel along adjacent turns of the helical coil of the spring 140. Depending on the position of the second tooth 114c along the helical coil, more or fewer turns of the helical coil may be retained by the second tooth 114c of the second retainer 114, thus changing the number of turns of the helical coil in the effective length of the spring 140. For instance, a clockwise rotation of the second retainer 114 may cause the second tooth 114c to retain a greater number of turns toward the first end 114a, while reducing the number of turns between the first tooth 112c and the second tooth 114c. This condition extends the helical coil of the spring 140 to increase the spring force exerted by the spring 140. In contrast, a counterclockwise rotation of the second retainer 114 may cause the second tooth 114c to release a number of turns of the helical coil toward the first retainer 112, which increases the number of turns between the first tooth 112c and the second tooth 114c. This condition allows the helical coil of the spring 140 to retract and decrease the spring force exerted by the spring 140. The rotational movement of the second retainer 114 can be applied by rotating the cap 130. The first portion 114a of the second retainer 114 may be inserted into or otherwise coupled to a portion of the cap 130. Thus, rotational movement of the cap 130 can be translated to the rotational movement of the second retainer 114.

Alternatively, the second retainer 114 can be fixed to the second end 140b of the spring 140. Accordingly, rotational movement of the cap 130 and the second retainer 114 may rotate the helical coil of the spring 140 in the same direction. As the second pin 124 prevents rotational movement of the first retainer 112, the helical coil of the spring 140 rotates over the second portion 112b of the first retainer 112. Consequently, the first tooth 112c travels along the turns of the helical coil at the first end 140a of the spring 140 and increases or decreases the number of turns of the helical coil retained by the first tooth 112c. Thus, by rotating the cap 130 which rotates the spring 140, a greater number of turns at the first end 140a of the spring 140 may be retained toward the first portion 112a of the first retainer 112 to reduce the number of turns in the effective length of the spring 140 and increase the spring force exerted by the spring 140. A reverse rotation of the cap 130 and the spring 140 may reduce the number of turns at the first end 140a of the spring 140 retained by the first tooth 112c to increase the number of turns of the helical coil in the effective length of the spring 140 and consequently reduce the spring force exerted by the spring 140.

In some examples, the second end 140b of the spring 140 can be directly coupled to the cap 130 without the second retainer 114. In these circumstances, rotation of the cap 130 directly rotates the helical coil of the spring 140. Alternatively, a tooth can be inwardly extended inside the tube 110 between the adjacent turns of the helical coil of the spring 140. In such an alternative arrangement, the helical coil of the spring 140 can be rotated by the cap 130 while the inwardly extended tooth travels along the turns of the helical coil to adjust the number of turns of the helical coil in the effective length of the spring 140.

In some examples, the second portion 114b of the second retainer 114 can surround the second end 140b of the spring 140 (instead of being inserted inside the second end 140b of the spring 140). In such examples, the second retainer 114 may include a hollow tube having an inwardly extended tooth inside the hollow tube. The second end 140b of the spring 140 can be inserted into the hollow tube of the second retainer 114, and the tooth of the hollow tube can travel between adjacent turns of the helical coil of the spring 140. The number of turns of the spring 140 in the effective length of the spring 140 may be adjusted in a similar way as described above by rotating the second portion 114b of the second retainer 114. In such examples, the structure and dimension of the first retainer 112 can be similar to or different than the second retainer 114.

FIG. 3A shows more detail of the first retainer 112 at the first end 110a of the tube 110 and coupled to the second portion 120b of the movable clip 120. In FIG. 3A, the shape and dimension of the second groove 126b, the third groove 126c, the first retainer 112, the first pin 122, and the second pin 124 are more clearly illustrated. A half portion of the first end 110a of the tube 110 and the movable clip 120 in z axis is schematically removed, similar to FIG. 2B, to show the internal components of the holder 100.

In some embodiments, the second portion 120b of the movable clip 120 has a circular cross section that can be concentric with the circular cross section of the tube 110 along the x axis. As illustrated, the second portion 120b has an inner diameter 120e that is less than the diameter 120d described above in FIG. 2A. The inner diameter 120e is slightly greater than the outer diameter 110c of the tube 110. The difference between the diameter 120e and the outer diameter 110c allows free axial movements of the movable clip 120 over an outer surface of the tube 110 in the x axis. In some examples, the outer surface of the first end 110a of the tube 110 or an inner surface of the second portion 120b of the movable clip 120 can include a coated material to reduce friction between the opposing, sliding surfaces. The coated material can be any type of anti-friction coatings (AFCs), such as lubricating paints. Alternatively, different types of dry or wet lubricants may be used to reduce the friction between the surfaces and provide free axial movement of the movable clip 120 along the first end 110a of the tube 110.

The first retainer 112 includes the first portion 112a having a width 112e and the second portion 112b having a width 112f in the z axis. As illustrated, the width 112e is greater than the width 112f and less than the outer diameter 110c of the tube 110. The first portion 112a includes an aperture 112h that allows coupling of the first retainer 112 to the movable clip 120 via the second pin 124. The second pin 124 is passed through the aperture 112h and coupled to the second portion 120b of the movable clip 120. In this fashion, the second pin 124 causes the movable clip 120 and the first retainer 112 move together when the movable clip 120 is extended or retracted. The smaller width 112f of the second portion 112b as compared with the width 112e allows the second portion 112b to be inserted into the first end 140a of the spring 140. The width 112f is designed small enough to freely move inside the helical coil of the spring 140. For this purpose, the width 112f is less than a diameter 140c of the helical coil of the spring 140. The second portion 112b includes the first tooth 112c. In some examples, an opposite tooth 112d can also extend from the second portion 112b opposite to the first tooth 112c in the z axis. A width from an outer end of first tooth 112c to the outer end of the opposite tooth 112d is greater than the diameter 140c of the spring 140. Accordingly, the first tooth 112c and the opposite tooth 112d are positioned between adjacent turns of the helical coil of the spring 140. While embodiments of the first retainer 112 may utilize only one tooth 112c, using two teeth 112c and 112d allows the first retainer 112 to retain the spring 140 with greater stability than a retainer with one tooth. Furthermore, while embodiments of the first retainer 112 may utilize two teeth 112c and 112d that are aligned opposite to each other, in other embodiments, the position of the first tooth 112c can be misaligned in the x axis with the position of the opposite tooth 112d.

In some embodiments, the second portion 112b of the first retainer 112 may be movable relative to the spring 140 to adjust the spring force exerted by the spring 140. By rotating the spring 140, the first tooth 112c (and the opposite tooth 112d, when utilized) travel between the turns of the helical coil to decrease or increase the number of turns retained by the first retainer 112 and thereby increase or decrease the number of turns in the effective length of the spring 140, which reduces or increases the spring force exerted by the spring 140.

In some embodiments where the first portion 112a is fixed by the second pin 124 extending through the second groove 126b and the third groove 126c, the second portion 112b may be constructed so as to be movable with respect to the first portion 112a. For instance, the second portion 112b may be attached to the first portion 112a with a rotatable component that allows the second portion 112b to rotate while the first portion 112a is fixed.

The second pin 124 has a length 124a along the y axis. The length 124a is greater than the inner diameter 120e of the movable clip 120. A first end of the second pin 124 can be fixed inside a hole on the second portion 120b of the movable clip 120. A second end of the second pin 124 also can be fixed in the second portion 120b with a second hole. The second pin 124 can axially move for a defined length along the tube 110 inside the second groove 126b. In some examples, the third groove 126c also exists in the tube 110 to allow the second end of pin 124 to be attached to the second hole and move with the movable clip 120. The second groove 126b has a length 116b in the x axis. The length 116b limits the axial movement of the second pin 124 and consequently limits the axial movement of the movable clip 120. Thus, the length 116b can be designed based on a required amount of movement of the movable clip 120. In some examples, the length 116b can be adjustable. In such a fashion, a removable object can be placed inside the second groove 126b. An operator can adjust the length 116b by inserting or removing the removable object inside the second groove 126b. Consequently, the amount of axial movement of the movable clip can be adjusted. The third groove 126c can be designed with the same structure and dimensions as the second groove 126b to provide consistent movement of the second pin 124 along the x axis. In addition, the grooves have a width in the z axis that is greater than a diameter of the second pin 124, to allow the second pin 124 to move within the grooves. The width of the grooves limits rotational movement of the movable clip 120 as well as the first retainer 112.

The first pin 122 is fixed to the first end 110a of the tube 110. A length 122a of the first pin 122 is greater than the inner diameter 120e of the movable clip 120. In some examples, the dimension and structure of the first pin 122 can be same as the second pin 124. The lengths 122a and 124a can be same as or slightly different than the outer diameter 120d of the movable clip 120 to be smoothly tangential to the outer surface of the second portion 120b of the movable clip 120. The first pin 122 may be arranged perpendicular to the second pin 124. The first pin 122 may extend out of the first end 110 of the tube 110 through a hole in one side of the tube 110 or two holes in opposite sides of the tube 110. The second portion 120b of the movable clip 120 includes the second groove 126b that is not shown in FIG. 3A but will be shown and described in FIG. 3B.

Figure 3B:
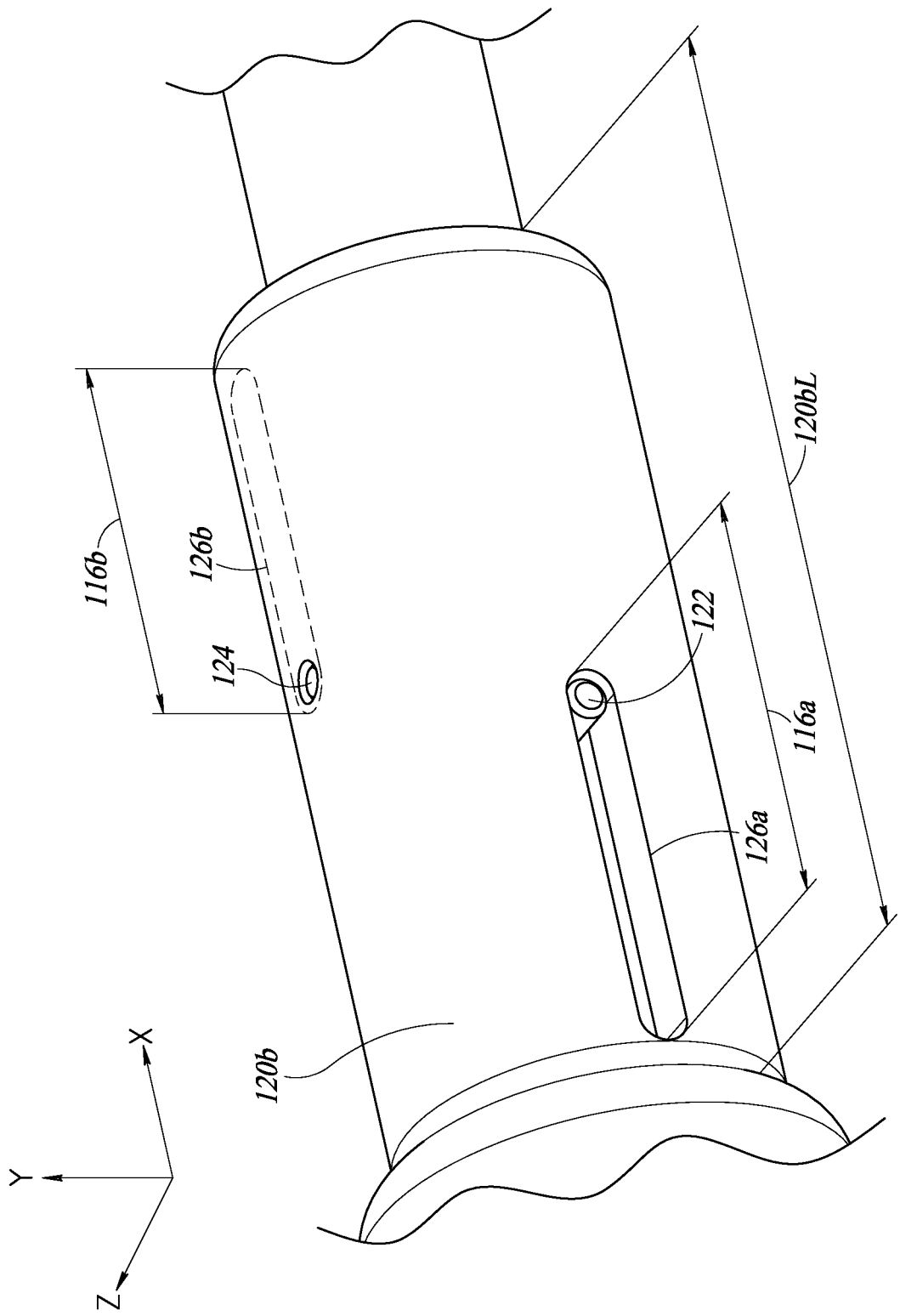
FIG. 3B provides a detailed view of a portion of a movable clip of the holder shown in FIG. 2B, in accordance with one or more embodiments.

FIG. 3B is an outer view of the second portion 120b of the movable clip 120 described in FIG. 3A. The first groove 126a is visible from the outer view, while the second groove 126b is hidden under the second portion 120b of the movable clip 120. The first groove 126a has a length 116a. The length 116a can define the limits of axial movement of the movable clip 120. In some examples, the length 116a of the first groove 126a can be same as the length 116b of the second groove 126b. Alternatively, the length 116a can be different than the length 116b. The groove having a smaller length may limit the axial movement of the movable clip 120. In addition, the first groove 126a can be arranged to limit an axial movement of the movable clip 120 in a first direction, while the second groove 126b limits an axial movement in a second direction opposite to the first direction. In various embodiments, the holder 100 may utilize only one of the grooves 126a, 126b. In such embodiments, the holder 100 may only include the first pin 122 coupled to the tube 110 and the first groove 126a, or the second pin 124 coupled to the movable clip 120 and the second groove 126b. The second portion 120b of the movable clip 120 may further include another groove opposite to the first groove 126a that is hidden in FIG. 3B. The opposite groove may have the same structure and dimensions as the first groove 126a, and the first pin 122 may travel within both the groove 126a and the groove in the opposite side of the movable clip 120. A total length 120bL of the second portion 120b of the movable clip 120 can be equal to or greater than a summation of the length 116a of the first groove 126a and the length 116b of the second groove 126b.

The width of the first groove 126a is greater than the diameter of the first pin 122, allowing the first pin 122 to travel within the first groove 126a. The width of the first groove 126a can be same as the width of the second groove 126b. The width of the first groove 126a in the y axis limits rotational movement of the movable clip 120. Using two pins 126a and 126b may enhance the performance and stability of the movable clip 120. In addition, the reliability of the holder 100 with two pins 126a and 126b and the corresponding grooves may be enhanced as compared to a holder with only one pin. In such embodiments, one of the pins can act as a backup for another. When one of the pins becomes loose in its corresponding groove, the other pin and groove may still provide sufficient stability and maintain the performance of the holder 100.

In some embodiments, the length 116a of the first groove 126a can be adjustable. Adjusting the length 116a can adjust the amount of axial movement of the movable clip 120. A removable object may be inserted into the first groove 126a to limit the movement of the first pin 122 inside the first groove 126a. For instance, the removable object can include an outer portion accessible to an operator and an inwardly extended portion that is coupled into the first groove 126a. The operator can move the object along the first groove 126a to change an effective length of the first groove 126a. In some embodiments, the operator can insert the removable object to adjust the length in some conditions and remove the object when the length 116a is sufficient and there is no need for adjustment.

Figure 4:
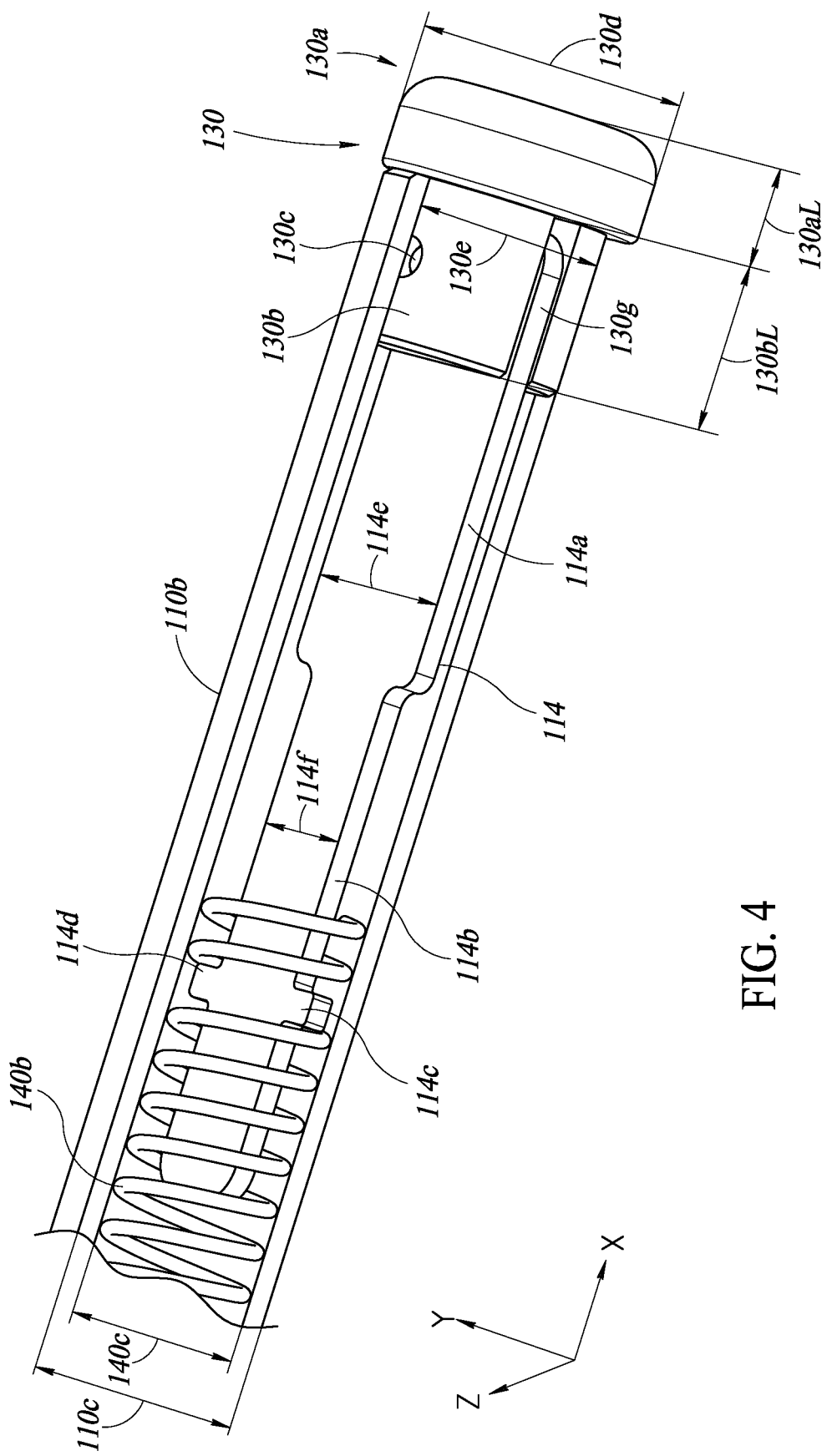
FIG. 4 provides a detailed view of a second end of the holder shown in FIG. 2B, in accordance with one or more embodiments.

FIG. 4 shows more detail of the second retainer 114 at the second end 110b of the tube 110 and coupled to the cap 130. In the embodiment shown, the shape and dimension of the second retainer 114 and the cap 130 are clearly illustrated. A portion of the second end 110b of the tube 110 in the z axis is schematically removed, similar to FIG. 2B, to show the internal components of the holder 100.

The second retainer 114 includes the first portion 114a having a width 114e and the second portion 114b having a width 114f in the z axis. As illustrated, the width 114e is greater than the width 114f and less than the outer diameter 110c of the tube 110. In some examples, the structure and dimensions of the second retainer 114 can be the same as the first retainer 112 as described in FIG. 3A. The smaller width 114f of the second portion 114b compared with the width 114e of the first portions 114a allows the second portion 114b to be inserted into the second end 140b of the spring 140. The width 114f is designed small enough to freely move inside the helical coil of the spring 140. For this purpose, the width 114f is less than the diameter 140c of the helical coil of the spring 140. The second portion 114b includes the second tooth 114c. In some examples, an opposite tooth 114d may also extend from the second portion 114b, opposite to the second tooth 114c in the z axis. A width from an outer end of the second tooth 114c to and outer end of the opposite tooth 114d is greater than the diameter 140c of the spring 140. Accordingly, the second tooth 114c and the opposite tooth 114d are positioned between adjacent turns of the helical coil of the spring 140. While embodiments of the second retainer 114 may utilize only one tooth 114c, using two teeth 114c and 114d allows the second retainer 114 to retain the spring 140 with greater stability than a retainer with one tooth. Furthermore, while embodiments of the second retainer 114 may utilize two teeth 114c and 114d that are aligned opposite to each other, the position of the second tooth 114c can be misaligned in the x axis with the position of the opposite tooth 114d.

In some embodiments, the second portion 114b of second retainer 114 may be movable relative to the spring 140 to adjust the spring force exerted by the spring 140. By rotating the second retainer 114, the second tooth 114c (and the opposite tooth 114d, when utilized) travel between the turns of the helical coil to decrease or increase the number of turns retained by the second retainer 114 and thereby increase or decrease the number of turns in the effective length of the spring 140, which reduces or increases the spring force exerted by the spring 140. The movement of the second retainer 114 can be provided by movement of the cap 130 by an outside motive source. For instance, a rotational force on the cap 130 may be applied manually by an operator or automatically by an external control system as described above in regard to FIG. 2A.

The cap 130 includes the outer portion 130a and an inner portion 130b. In embodiments in which the tube 110 has a circular cross-sectional shape, the outer portion 130a and the inner portion 130b may have a similar circular cross-sectional shape. The outer portion 130a has the diameter 130d and a length 130aL. The inner portion 130b has a diameter 130e and a length 130bL. The diameter 130d is greater or equal to the outer diameter 110c of the tube 110. The diameter 130e is less than the diameter 110c of the tube 110. The greater diameter 130d of the outer portion 130a allows the cap 130 be retained outside of the tube 110 at the second end 110b of the tube 110. In addition, length 130aL of the outer portion 130a provides an enough surface to ease grasping and twisting of the cap 130 by an operator. In some cases, the operator may pull the cap 130 away from the tube 110 by applying an outward force in the x axis on the outer portion 130a. By pulling the cap 130 away from the tube, the operator can check or maintain the spring 140 and the second retainer 114 as well as manually rotate the second retainer 114 or the spring 140 to change the number of turns of the helical coil of the spring 140 in the effective length of the spring 140, as earlier discussed. The smaller diameter 130e allows the inner portion 130b of the cap 130 be inserted into the tube 110 and freely rotate to translate any external rotational forces on the cap 130 to the second retainer 114.

The inner portion 130b includes an opening 130c along the y axis and a gap 130g in a x-z plane. The first portion 114a of the second retainer 114 can be inserted into the gap 130g to be attached to the cap 130. The coupling of the first portion 114a to the cap 130 via the gap 130g allows the second retainer 114 to move in the same direction with the same force as movement of the cap 130. In some embodiments, a pin may be passed through the opening 130c into an aperture on the first portion 114a of the second retainer 114 to secure the second retainer 114 to the cap 130. While such pin and aperture are not shown in FIG. 4, the pin and aperture arrangement of the second retainer 114 can be similar to the arrangement of the second pin 124 and the aperture 112h of the first retainer 112.

Figure 5:
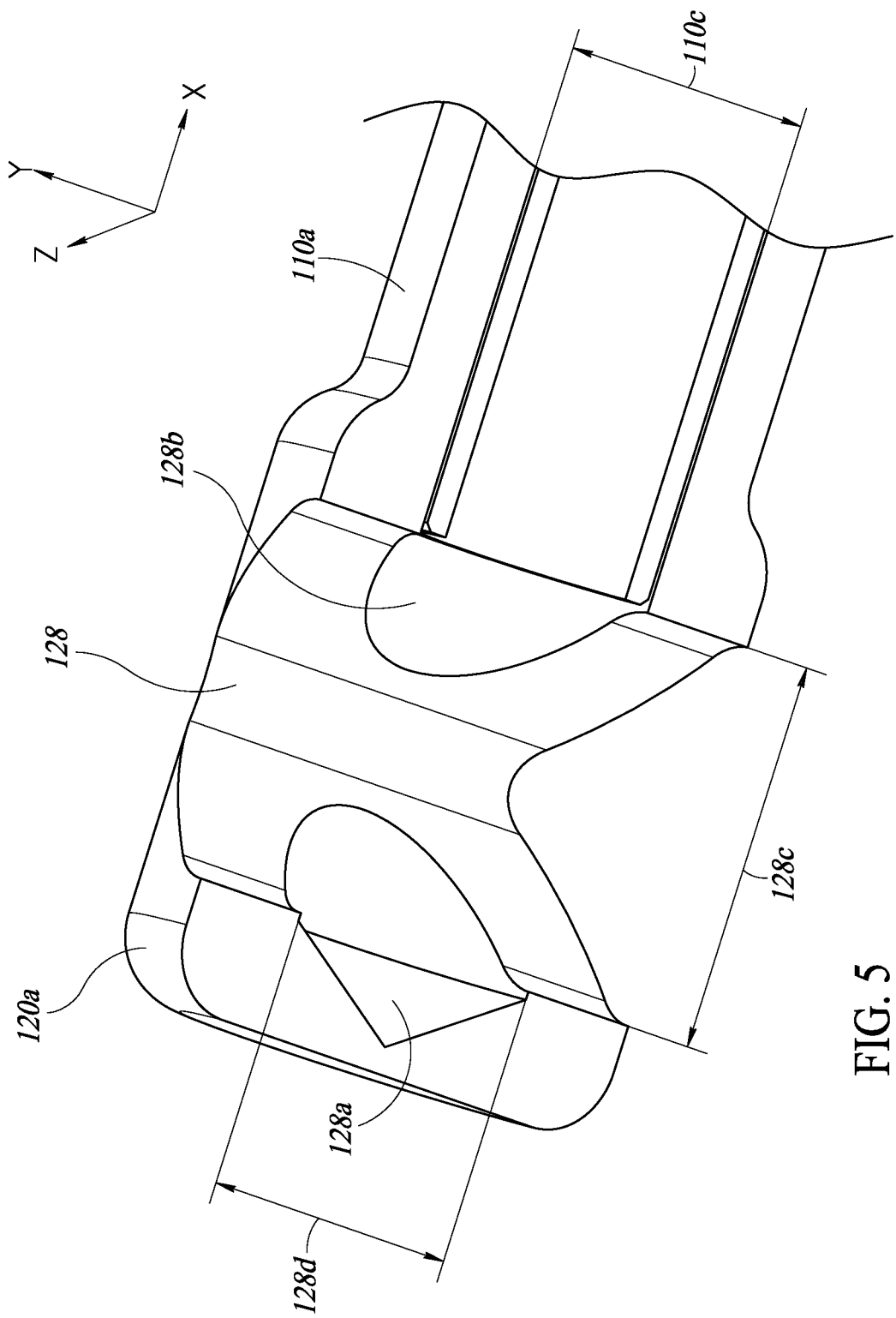
FIG. 5 provides a detailed cross-sectional view of a head of the movable clip shown in FIG. 2B, in accordance with one or more embodiments.

FIG. 5 shows more detail of the first portion 120a of the movable clip 120. A portion of the first end 110a of the tube 110 and the movable clip 120 in z axis is schematically removed, similar to FIG. 2B, to show the internal shape and dimensions of the movable clip 120. The first portion 120a includes the aperture 128 extended along the y axis. The aperture 128 includes a first opening 128a and a second opening 128b along the x axis. The first opening 128a and the second opening 128b can be concentric with the first end 110a of the tube 110. The first opening 128a and the second opening 128b have a diameter 128d that is slightly greater than the outer diameter 110c of the tube 110. The openings 128a and 128b allow the first end 110a of the tube 110 to axially move inside the aperture 128 in the x axis.

The aperture 128 has a diameter 128c in the x axis. In some embodiments, the size of the aperture 128 may be symmetric in the z axis and x axis. In some embodiments, the aperture 128 may be diamond shape with four corners in an x-z plane cross-section. In some embodiments, all four corners may have the same shape and same dimension. In some embodiments, each corner of the aperture 128 may have a concave shape. The concave shape of the corners allows an object with different dimensions to be held at a consistent position within the aperture 128. Alternatively, some or all of corners may be convex to provide directed holding force to relatively smaller objects inserted into the aperture 128.

In a retracted position of the movable clip 120, the first end 110a of the tube 110 moves inside the opening 128a toward the outer end of the moveable clip to close the aperture 128. An operator can move the movable clip 120 axially outward from the first end 110a of the tube 110 to an extended position, which opens the aperture 128 as shown in FIG. 5. This causes the spring 140 to extend with the movable clip 120 and thus exert greater spring force on the movable clip 120. With the movable clip 120 in the extended position, an object can be inserted into the aperture 128. After inserting the object into the aperture 128, the operator can release the movable clip 120, whereupon the spring 140 biases the movable clip toward the retracted position. This causes the first end 110a of the tube to slide through the second opening 128 in the x axis until the first end 11a contacts the object, thereby capturing the object between the first end 110a of the tube 110 and an inner surface of the aperture 128 at the outer end of the movable clip 120. A frictional force exerted on the object by the outer end of the movable clip 120 and the first end 110a holds the object within the aperture 128.

Thus, by releasing the movable clip 120, the spring 140 is retracted to a maximum possible position that is determined by a maximum dimension of the object in the aperture 128. The maximum dimension of the object in the aperture 128 can be equal or less than the diameter 128c of the aperture 128. Accordingly, a first surface of the object is positioned tangential to the first end 110a of the tube 110 while a second surface of the object is positioned tangential to an inner surface of the aperture 128 at the opening 128a.

In some examples, a cross-sectional surface of the first end 110a of the tube 110 can be concave to increase a contact surface with the object being held inside the aperture 128. Alternatively, the cross-sectional surface of the first end 110a of the tube 110 can be convex to increase an applied force to a center part of the object in the aperture 128, improving the ability of the holder 100 to hold relatively smaller objects. In embodiments where the aperture 128 has a diamond shape, different objects with different dimensions are centered inside the aperture 128 in the x and z axes. Accordingly, the dimension of the aperture 128 is effective adjusted based on the dimension of the object being held in the aperture 128. An operator opens the aperture 128 by extending the movable clip 120, inserts the object into the aperture 128, and releases the movable clip 120 to hold the object in the aperture 128. The holding force that the movable clip 120 exerts on the object can be adjusted by the adjusting the spring force on the movable clip 120, as described above.

In some embodiments, the aperture in the holder may have a different shape and structure than the aperture 128 described above and shown in the accompanying figures. For instance, the aperture 128 may have a flat end in a side 128a of the aperture or in a side 128b of the aperture. In some examples, the aperture 128 may have an opening in a first side, e.g., in the y axis, while an opposite side of the aperture 128 is closed. In this fashion, an object can be inserted through the opening into the aperture 128 to be held by the holder 100. It is not necessary that the object pass axially through a closed-sided aperture 128. Having an opening on one side of the aperture and an opposite side that is closed may be beneficial when using the holder 100 in a limited space environment. The closed side prevents the object from passing through the aperture 128 and fall out, which could damage the object or an instrument in use. In some examples, the aperture 128 may have an open side in the z axis. In this fashion, an object can be inserted into the aperture 128 from the open side in the z axis instead of the y axis. Again, having an open side in this manner may be beneficial when using the holder 100 in environments in which access in the direction of the y axis is limited. In addition, the holder 100 may be rotated inside the opening 162a of the cross support 162 as described in FIG. 1B. Hence, the aperture 128 can face in any desired direction based on the application. For instance, the aperture 128 can adjustably hold an object vertically in the y axis or horizontally in the z axis. Moreover, by rotation of the holder 100 in the cross support 162, the aperture 128 is able to hold an object at any desired angle in a y-z plane.

Figure 6:
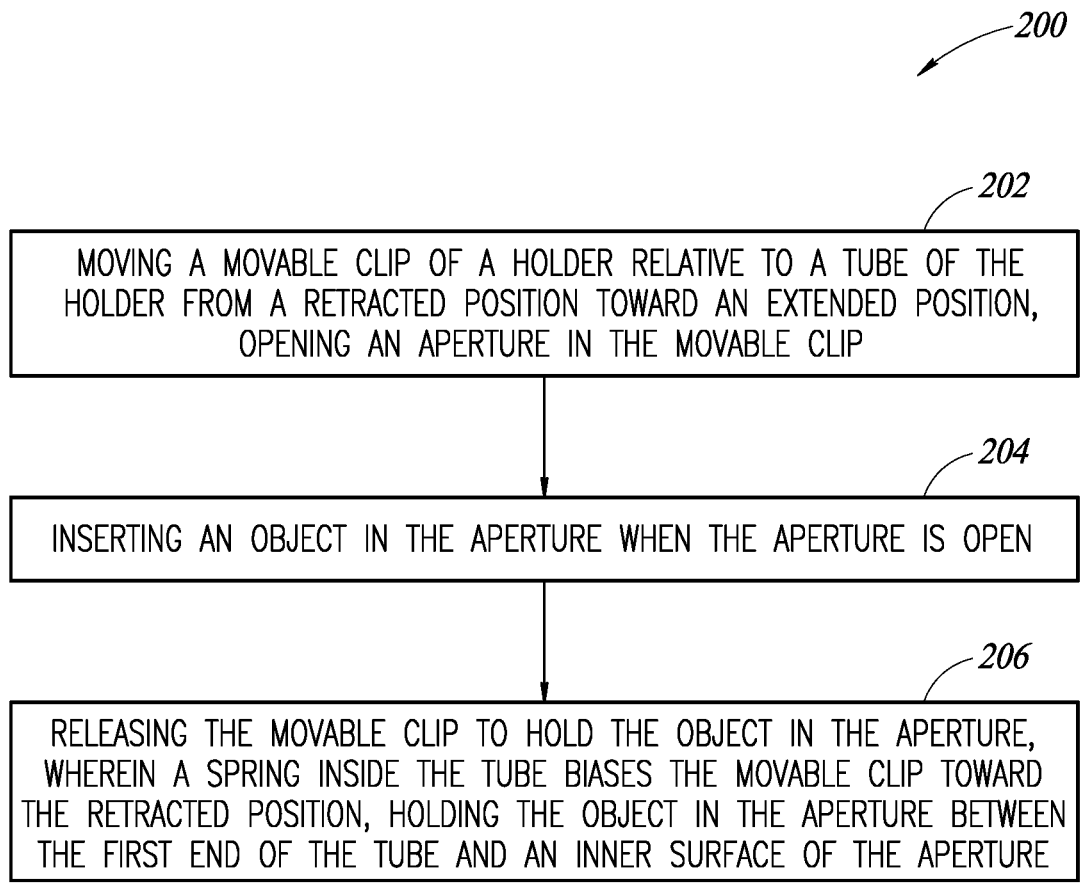
FIG. 6 is a flowchart showing a method in accordance with one or more embodiments of the present disclosure.

A method 200 for holding an object by a holder according to the present disclosure is illustrated, by way of example, in a flow chart shown in FIG. 6. A first step 202 of the method 200 includes moving a movable clip 120 of the holder 100 relative to a tube 110 of the holder 100 from a retracted position toward an extended position. As described earlier herein, the movable clip 120 has an aperture 128 configured to hold the object when the object is inserted into the aperture 128. The aperture 128 is closed by the tube 110 when the movable clip 120 is in the retracted position, and the aperture 128 is open when the movable clip 120 is in the extended position.

A second step 204 of the method 200 includes inserting an object in the aperture when the aperture is open. A third step of the method 200 includes releasing the movable clip 120 to hold the object in the aperture 128. As described above, a spring 140 inside the tube 110 biases the movable clip 120 toward the retracted position. The spring 140 has a first end 140a coupled to the movable clip 120 at a first end 110a of the tube 110, and a second end 140b coupled to a cap 130 at a second end 110b of the tube 100. Releasing the movable clip 120 causes the movable clip 120 to hold the object in the aperture 128 between the first end 110a of the tube 110 and an inner surface of the aperture 128.

In additional aspects, methods of the present disclosure may include features wherein rotating the cap adjusts a spring force that the spring inside the tube exerts on the movable clip; wherein rotating the cap causes at least one tooth of a retainer coupled to the cap to travel between adjacent turns of a helical coil forming the spring, the at least one tooth causing an increased or decreased number of turns of the helical coil to be retained by the retainer; wherein rotating the spring causes at least one tooth of a retainer coupled to the movable clip to travel between adjacent turns of a helical coil forming the spring, the at least one tooth causing an increased or decreased number of turns of the helical coil to be retained by the retainer; limiting an axial movement distance of the movable clip between the retracted position and the extended position by a length of a groove defined in the tube; and moving the movable clip relative to the tube causing a pin coupled to the movable clip to travel within the groove defined in the tube.

Figure 7:
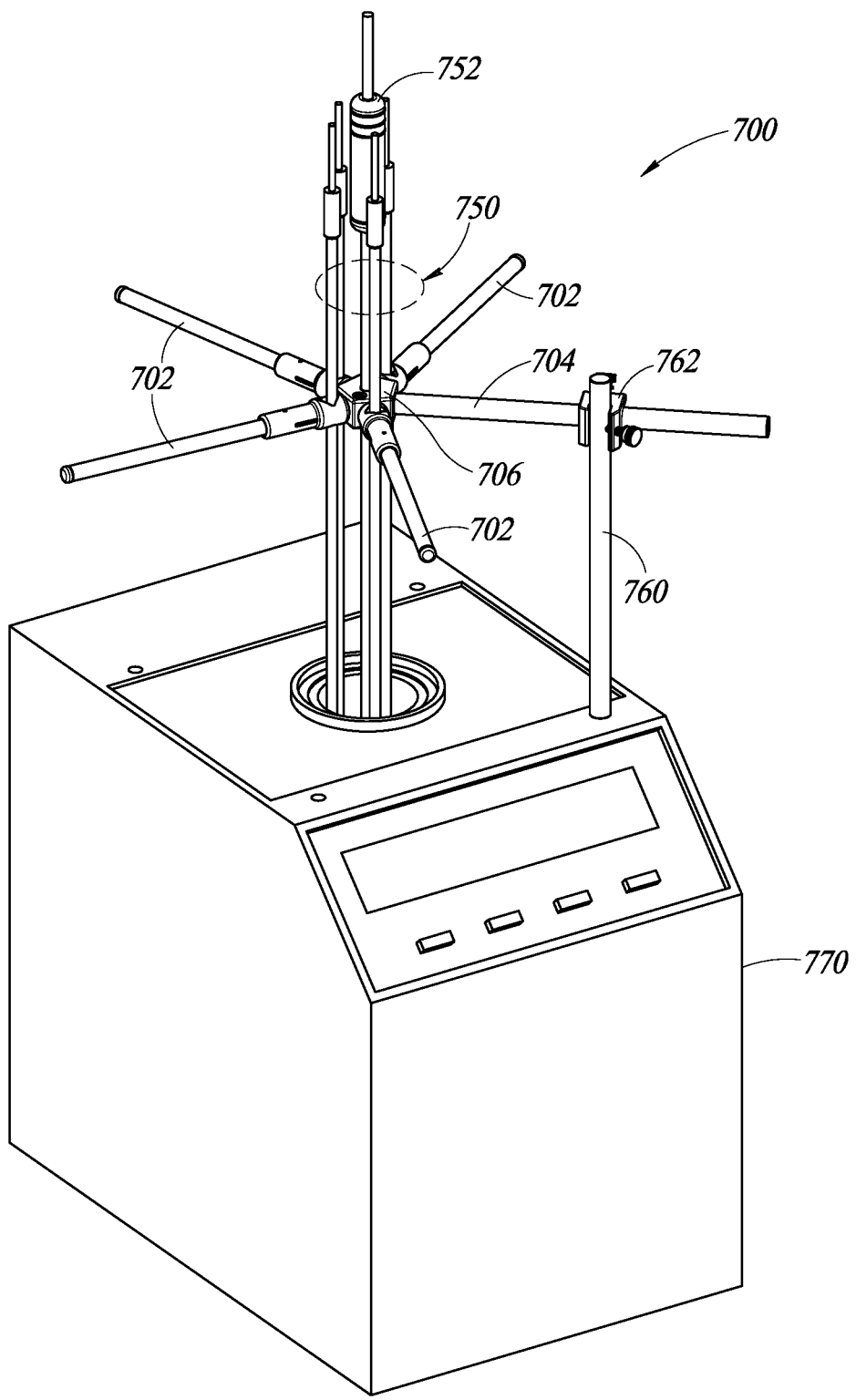
FIG. 7 depicts a holding system configured to hold a plurality of objects such as probes, in accordance with one or more embodiments of the present disclosure.

FIG. 7 is a perspective view of a holding system 700 configured to hold a plurality of objects, such as measurement probes 750, in a fixed position. The holding system 700 can be used in various applications such as with a probe to be held in a calibration bath 770. The plurality of measurement probes 750 may be measurement tools to be positioned in an environment and measure a characteristic of the environment (e.g., fluid temperature in the calibration bath 770). For instance, the characteristic may include temperature, pressure, humidity, vibration, density, or viscosity, or a combination thereof. In various embodiments, the holding system 700 may be used to hold objects other than a measurement probes 750. In various embodiments, each of the plurality of measurement probes 750 may correspond to the measurement probe 150 described in FIG. 1A.

In some embodiments, the plurality of measurement probes 750 may include a main probe 752 that is held at a center of the other probes of the plurality of measurement probes 750. The main probe 752 may be a standard that provides a calibrated reference for other probes being calibrated. For instance, the main probe 752 may measure the temperature of the calibration bath 770. In this manner, the temperature as measured by the main probe 752 can be used as a reference for calibrating other temperature measurement probes 750 that are held in the same calibration bath 770 with the main probe 752.

In some embodiments, the holding system 700 includes a plurality of holders 702. Each of the plurality of holders 702 may correspond to the holder 100 described in FIGS. 1A to 5. A length of the each of the plurality of holders 702 may be less than the length of the holder 100 described in FIGS. 1A to 5 to reduce an area which is occupied by the holding system 700. In various embodiments, the holding system 700 includes a vertical column 760, and a cross support 762 that couples a horizontal column 704 to the vertical column 760. The vertical column 760 and the cross support 762 may correspond to the vertical column 160 and the cross support 162 described in FIGS. 1A-1B.

An end of the horizontal column 704 is coupled to a central holding device 706. The horizontal column 704 is fixed to the cross support 762 and keeps the central holding device 706 in a fixed position. In alternative embodiments, the holding system 700 may not include one or more of the vertical column 760, the cross support 762, or the horizontal column 704. In at least one alternative embodiment, a holder 702 may be used instead of the horizontal column 704 to couple the central holding device 706 to the vertical column 760. In some examples, the plurality of holders 702 may be coupled to the central holding device 706 without the vertical column 760. In this condition, the main probe 752 may fix the central holding device 706 in a vertical position. Thus, the plurality of holders 702 can be coupled to the central holding device 706 at the same vertical position.

Figure 8:
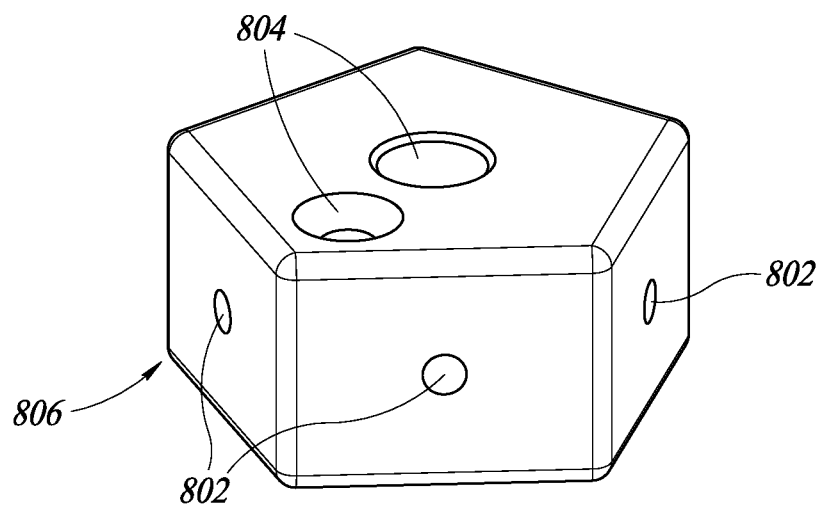
FIG. 8 provides a detailed view of the central holding device shown in FIG. 7, in accordance with one or more embodiments.
Figure 11:
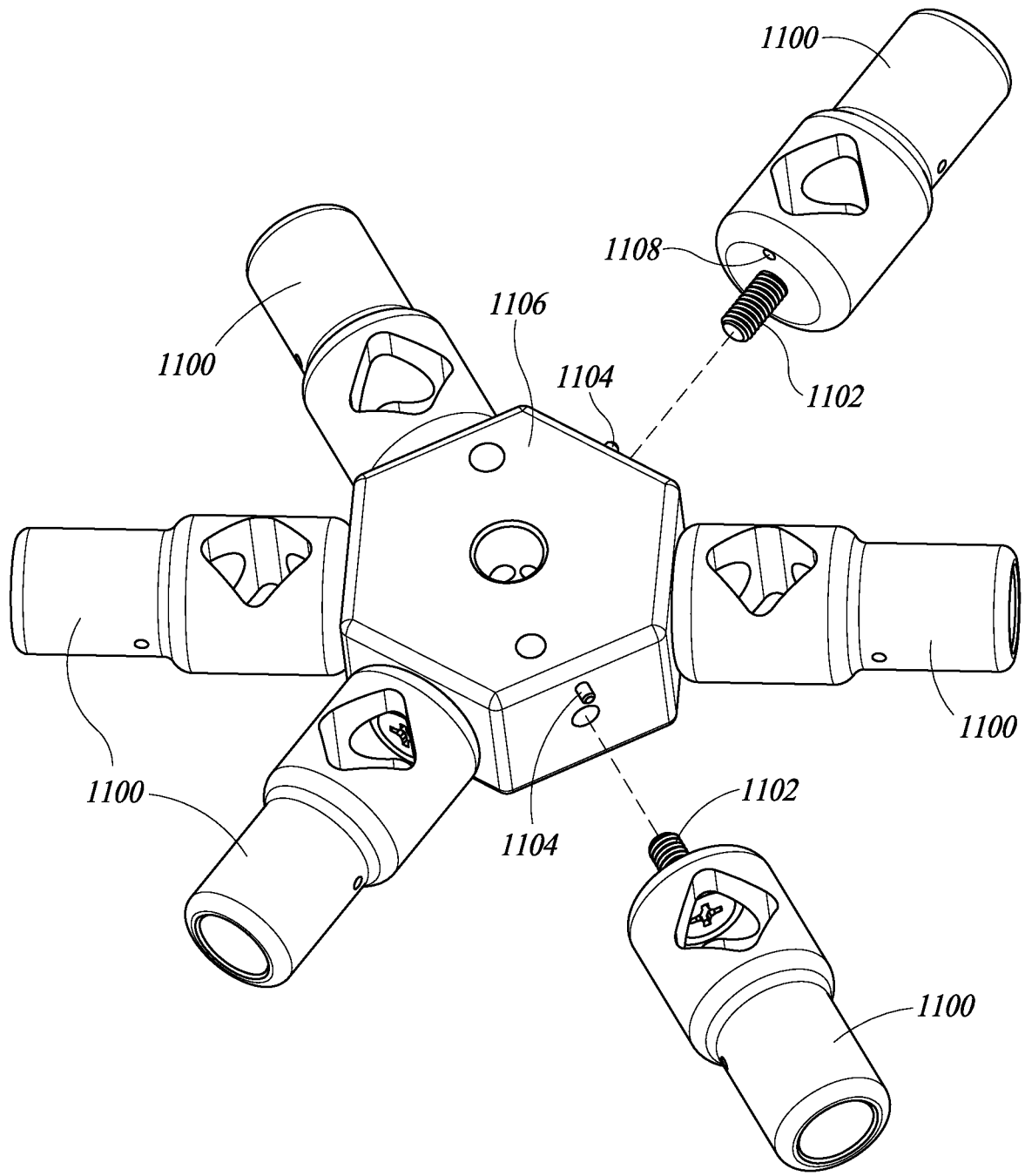
FIG. 11 provides a detailed view of plurality of movable clips coupled to a central holding device, in accordance with one or more embodiments.
Figure 12:
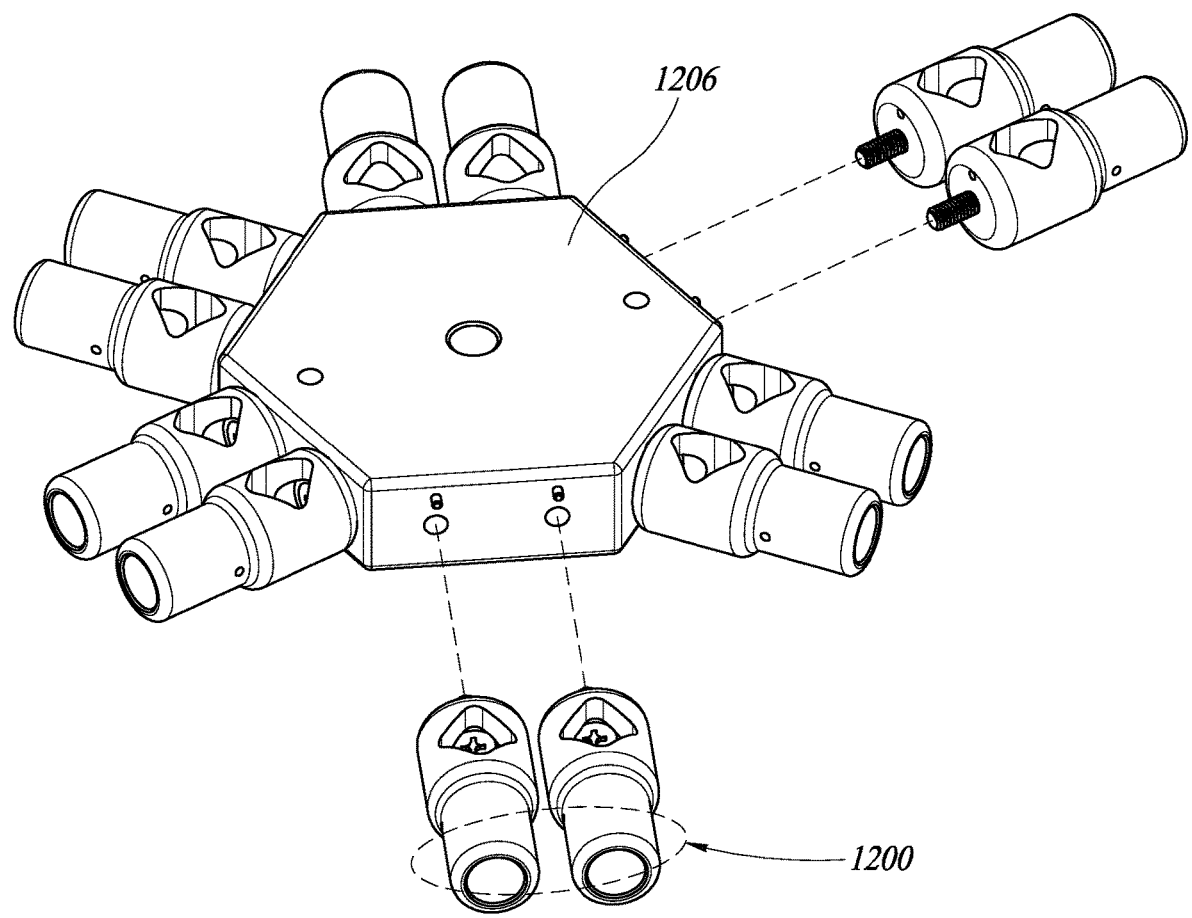
FIG. 12 provides a detailed view of plurality of movable clips coupled to another embodiment of a central holding device, in accordance with one or more embodiments.

In various embodiments, the central holding device 706 includes a periphery to which the plurality of holders 702 are couplable (e.g., as illustrated in FIGS. 11 and 12). The central holding device 706 also includes one or more vertically-oriented apertures (e.g., as illustrated in FIG. 8 and other figures herein). In some embodiments, the periphery of the central holding device 706 includes a plurality of horizontally-oriented coupling apertures (e.g., 802 in FIG. 8) configured to couple respective holders of the plurality of holders 702 to the central holding device 706. In various embodiments, the movable clip (corresponding to the movable clip 120 in FIGS. 2A-2B) of each holder of the plurality of holders 702 may include a fastener (e.g., 1102 in FIG. 11) to be coupled into one of the plurality of horizontally-oriented coupling apertures. In various embodiments, the fastener may include any of a variety of fastener structures, such as a screw. In various embodiments, the central holding device 706 or the holder 702 may include a key (e.g., 1104 in FIG. 11) that helps fix the respective holder 702 (and in particular, the aperture 128 of the holder) in a desired position relative to another object, such as the calibration bath 770. Further discussion of a key is provided with respect to FIGS. 11 and 12.

The embodiment of FIG. 7 shows an example of a pentagon-shaped central holding device 706 capable of simultaneously holding four holders 702 and a horizontal column 704. In embodiments where the horizontal column 704 is replaced by another holder 702, the central holding device 706 is capable of simultaneously holding five holders. However, embodiments of the central holding device 706 are not limited to a pentagon-shaped device. In other embodiments, the central holding device 706 may have different polygon shapes such as a triangle, quadrilateral, hexagon, heptagon, octagon, nonagon, decagon, etc. For a polygon-shaped central holding device, each peripheral side of the polygon shape may include one or more horizontally-oriented coupling apertures configured to couple one or more respective holders. The polygon shape may be enlarged as needed, so each peripheral side of the polygon can include more than one horizontally-oriented coupling aperture configured to couple more than one holder.

The embodiment of FIG. 7, as well as other embodiments described herein, thus illustrate a system for holding measurement probes within a calibration bath. In such implementation, the system includes a calibration bath 770, a supporting structure 704, 760, 762, and a central holding device 706. The supporting structure includes a vertical column 760 attached to the calibration bath 770, a cross support 762 that is movable along the vertical column and securable to the vertical column, and a horizontal column 704 that is securable to the vertical column by the cross support. The cross support 762 provides vertical and horizontal positioning of the horizontal column 704 relative to the calibration bath 770. As described herein, the central holding device 706 is coupled to the horizontal column 704 and includes one or more vertically-oriented apertures 804 (FIG. 8) and has a periphery that includes a plurality of horizontally-oriented coupling apertures 802.

In some alternative embodiments, the central holding device may have a curved shape, such as a circular or elliptical shape. In such alternative embodiments, the number of horizontally-oriented coupling apertures on the periphery of the central holding device is limited only by horizontal dimensions of the circle or ellipse, and the horizontal dimensions of the holders to be coupled to the horizontally-oriented coupling apertures. For instance, by increasing the diameter of the circle, the central holding device 706 is capable of having more horizontally-oriented coupling apertures. In some embodiments, the central holding device 706 may include an adjustable structure. In this condition, for example, a dimension of the central holding device 706 may be adjusted mechanically or electrically with an electrical motor. For instance, an operator may adjust the dimension of the central holding device 706 before installation in the holding system 700. In some embodiments, the dimension of the central holding device 706 may be adjusted dynamically when the central holding device is installed or used in the holding system 700.

FIG. 8 depicts an embodiment of the central holding device 706 described in FIG. 7. In this embodiment, a pentagon-shaped central holding device 806 corresponds to the central holding device 706 described in FIG. 7. The pentagon-shaped central holding device 806 includes a plurality of horizontally-oriented coupling apertures 802. In this embodiment, each side on the periphery of the pentagon-shaped central holding device 806 includes one horizontally-oriented coupling aperture 802. However, in some embodiments, the number of horizontally-oriented coupling apertures in each side may be more than one based on the dimension of the pentagon-shaped central holding device 806 and the size of the holders to be fastened to the coupling apertures 806. As shown, each horizontally-oriented coupling aperture 806 is configured to couple one holder to the central holding device 806. In some embodiments, each horizontally-oriented coupling aperture may be threaded to receive a corresponding threaded fastener extending from the outer end of the movable clip of the respective holder. In addition, as shown in FIG. 11, each side on the periphery of the central holding device may include a key 1104 (e.g., a pin or other fastening structure) that fits into a corresponding aperture 1108 to fix the position of the respective holder in a desired position.

The pentagon-shaped holding device 806 also includes plurality of vertically-oriented apertures. In the embodiment of FIG. 8, the plurality of vertically-oriented apertures includes two apertures 804, 805. However, the number of vertically-oriented apertures may be different for various embodiments. In some embodiments, the vertically-oriented aperture 804 is a central aperture that is configured to support a central probe such as the main probe 752 described in FIG. 7. In some embodiments, the central aperture 804 or another vertically-oriented aperture may couple the central holding device 806 to an object such a vertical column for connection to an adjacent support apparatus, instead of a central probe, to support the central holding device 806 at a fixed position relative to an external instrument, such as a calibrator. In some embodiments, the central aperture may include an O-ring gasket to retain the central probe or the vertical column in a fixed position. Alternatively, the central aperture may include threading and pin to retain the central probe or vertical column.

Figure 9:
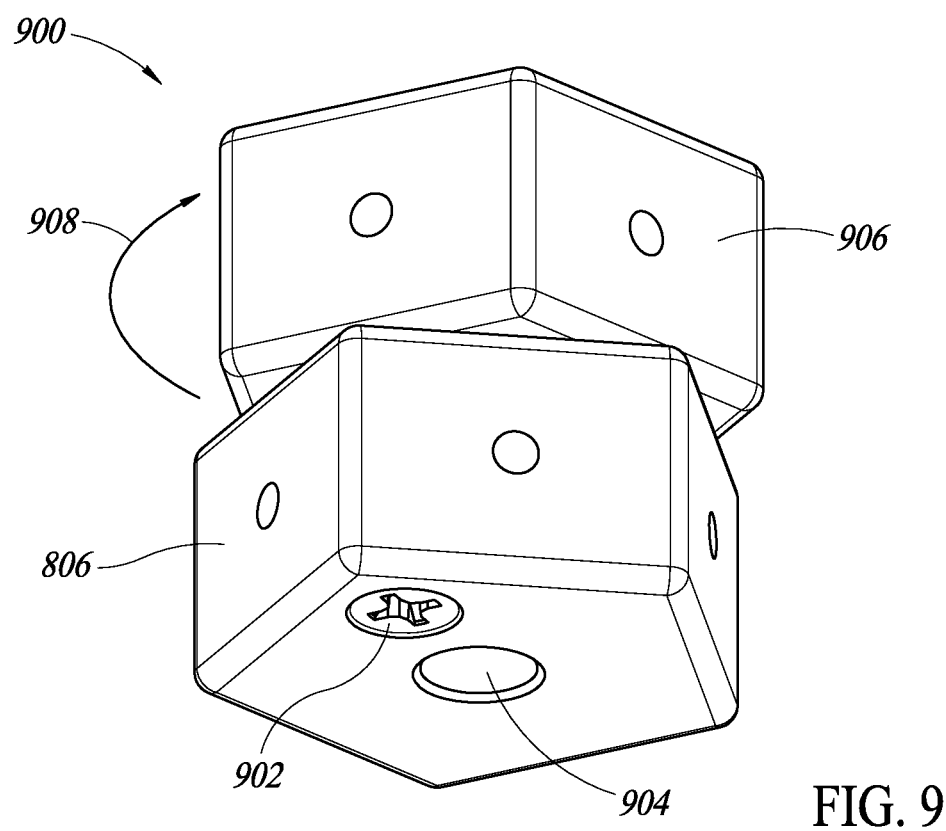
FIG. 9 provides a detailed view of a multi-level central holding device, in accordance with one or more embodiments.

In various embodiments, the plurality of vertically-oriented apertures includes one or more apertures 805 to a side of the central aperture. The one or more apertures 805 provide for fastening the central holding device 806 to one or more other central holding devices or to an adjacent support apparatus. For instance, another central holding device may be attached to the central holding device 806 by way of the fastening aperture 805, e.g., as illustrated in FIG. 9. In this embodiment, a screw may pass through one aperture 805 of a central holding device into an aligned aperture 805 of another central holding device.

FIG. 9 is an example of a multi-level central holding device 900 including two central holding devices 806 and 906 coupled together by a screw 902. In this embodiment, the pentagon-shaped holding device 806 is coupled to another pentagon-shaped holding device 906, while the central apertures 904 of the two central holding devices 806, 906 are aligned. Thus, a main probe or a vertical column may be coupled to and pass through the central apertures 904.

Figure 10:
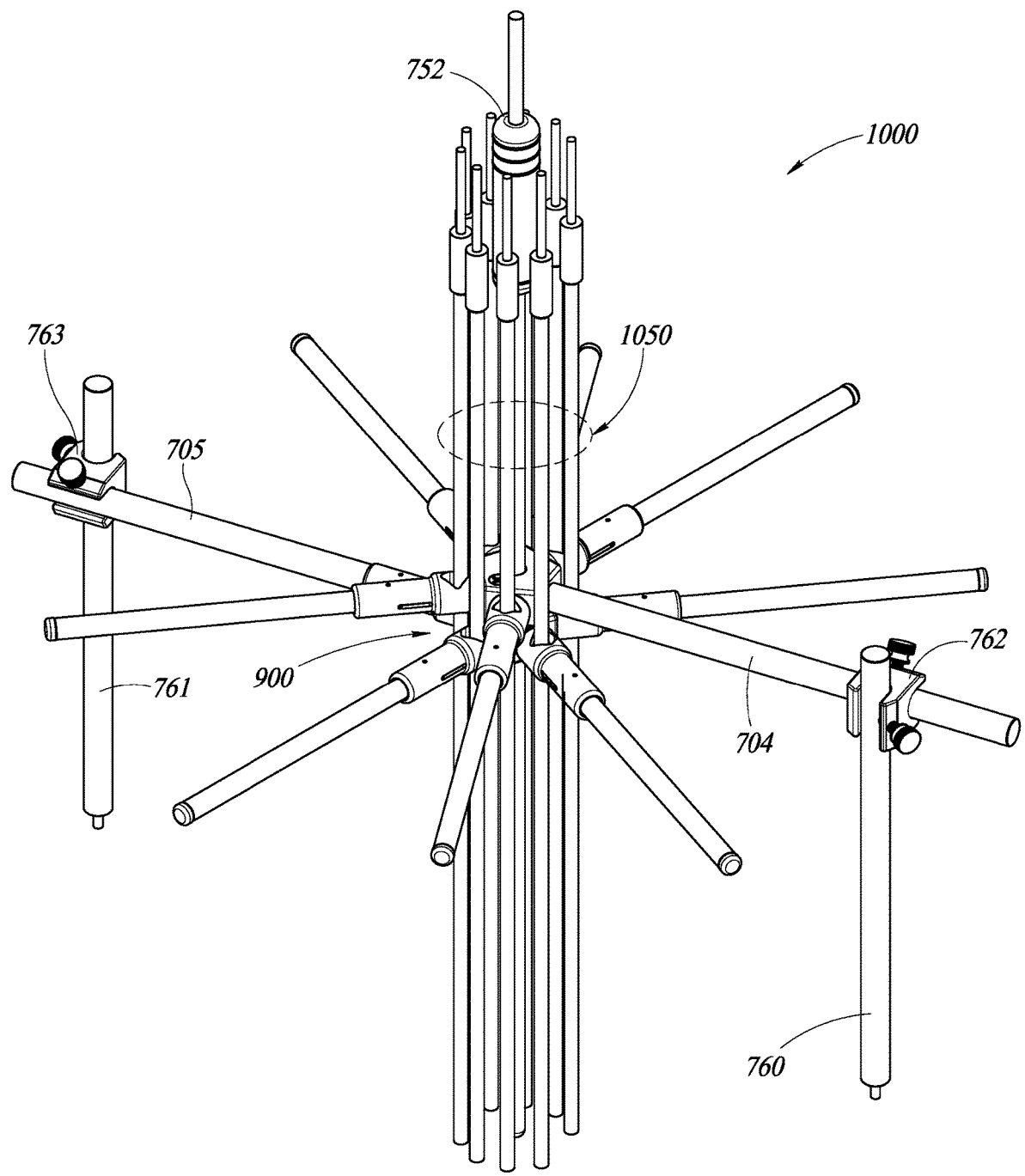
FIG. 10 depicts a holding system configured to hold a plurality of objects such as probes, in accordance with one or more embodiments of the present disclosure.

In the embodiment shown in FIG. 9, the central holding device 806 has a rotational offset 908 relative to the central holding device 906. The rotational offset 908 allows the central holding device 906 to hold a plurality of holders at positions between the plurality of holders that may be held by the central holding device 806 (e.g., as illustrated in FIG. 10). In this condition, the space is maximized for holding as many holders as possible. For example, the pentagon-shaped holding device 806 may be configured to hold one holder on each side of its periphery (thus holding a total of five holders) and the pentagon-shaped holding device 906 may hold similarly hold one holder on each side of its periphery (holding a total of five holders). The multi-level holding device 900 illustrated in FIG. 9 is thus capable of holding up to a total of ten holders.

The multi-level holding device 900 may be configured to hold any number of holding devices, different than the number of holding devices described with regard to FIG. 9. Moreover, each of the central holding devices 806, 906 may have a shape different than a pentagon shape, e.g., as described with respect to FIG. 7. In various embodiments, the shape of the central holding device at each level may be different than the shape used at other level(s). For example, one of the central holding devices, e.g., 806, may be pentagon shaped while the other central holding device, e.g., 906, is circular shaped.

In addition, the multi-level holding device 900 may include more than two central holding devices attached together, and the multiple holding devices may have the same shape or different shape from each other. In addition, the dimensions of the central holding devices may be enlarged to allow each side of each holding device, e.g., the central holding devices 806, 906, to hold more than one holder (an example of which is described in FIG. 12). In addition, in cases where the holding devices are polygon shaped, corners of the polygon shape may include apertures to retain holders at the corners in addition to the sides.

In some embodiments, different types of fastening devices may be used to couple the central holding devices together, in place of a screw 902. Such fastening devices may include a key, a clip, or a welding structure, for example. In some embodiments, each of the central holding devices 806, 906 of the multi-level holding device 900 may include more than one aperture to attach different central holding devices together, by way of a screw 902 or other type of fastening device.

FIG. 10 depicts a holding system 1000 configured similar to the holding system 700 described in FIG. 7. The main difference between the holding system 1000 and the holding system 700 is the use of a multi-level central holding device 900 (as shown in FIG. 10) instead of a single level central holding device (as shown in FIG. 7). In the embodiment shown in FIG. 10, a plurality of measurement probes 1050 includes more measurement probes than the plurality of measurement probes 750 in FIG. 7, due to using the multi-level central holding device 900. The main probe 752 is passed through the central aperture 904 and eight measurement probes are supported by the central holding device 900, for example to be held within an external instrument such as the calibration bath 770 shown in FIG. 7.

In the embodiment shown in FIG. 10, in addition to the vertical column 760, the cross support 762, and the horizontal column 704 that is coupled to one level of the multi-level central holding device 900, another vertical column 761, cross support 763, and a holder 705 is coupled to another level of the multi-level holding device 900, adding further stability to the holding system 1000. In some embodiments, the holder 705 may be replaced by a horizontal column, such as the horizontal column 704, to increase the stability of the holding system 1000. In an alternative embodiment, the horizontal column 704 may be replaced with a holder, and the total number of measurement probes 1050 supported by the holding system 1000 can increase to ten measurement probes. In yet other embodiments, the shape and size of the multi-level holding device 900 may be different, as described with respect to FIG. 9, so that the holding system 1000 can hold more than ten measurement probes.

FIG. 11 depicts details of fastening a plurality of holders 1100 to a hexagon-shaped central holding device 1106. Each of the plurality of holders 1100 may correspond to a holder 100 as described in FIG. 2A. A main difference between the holder 100 and each of the plurality of holders 1100 is a fastening structure 1102 that extends from an end of each of the plurality of holders 1100. The fastening structure 1102 allows each of the plurality of holders 1100 to attach the hexagon-shaped central holding device 1106. In various embodiments, the hexagon-shaped central holding device 1106 may be shaped different than a hexagon, such as a pentagon-shaped central holding device 806 as shown in FIG. 8 or other possible shapes as described with respect to FIG. 7.

The fastening structure 1102 may include a post or a screw extending outward from the end of each of the plurality of holders 1100, to fit into a corresponding horizontally-oriented coupling aperture on the periphery of the hexagon-shaped central holding device 1106. In various embodiments, the central holding device 1106 may include a key 1104 (e.g., a post) extending outward that fits into a corresponding aperture 1108 on the end of each of the plurality of holders 1100. This key 1104 retains the respective holder in a particular orientation relative to the central holding device 1106. Consequently, each of the plurality of holders 1100 is capable of holding an object in a correct position when an object is inserted and held within the movable clip of the respective holder. Alternatively, the key 1104 may be a part of the holder 1100 and extend outward from the end of each of the holders 1100 into a corresponding aperture on the periphery of the central holding device 1106. Either way, the key 1104 retains the respective holder of each of the plurality of holders 1100 in a particular orientation relative to the central holding device 1106.

In some embodiments, a suitable key structure may include magnets such as permanent magnets, temporary magnets, and electromagnets. For instance, an electrical circuit may be coupled to an electromagnet of the key structure. In this condition, by turning on the electrical circuit, an electrical current activates the electromagnet which attracts a corresponding metal structure or an opposite magnet to retain the respective holder 1102 in a particular orientation relative to the central holding device 1106. The electrical circuit may include any electrical components to generate a constant electrical current and supply into a coil to activate the electromagnet when the circuit is switched on.

FIG. 12 is an embodiment of a hexagon-shaped central holding device 1206 with substantially the same structure as the hexagon-shaped holding device 1106 but having a different dimension. In this embodiment, the dimension of the hexagon-shaped central holding device 1206 is enlarged as compared with the hexagon-shaped central holding device 1106 in FIG. 11. Each side of the central holding device 1206 is capable of holding two holders 1200. Hence, the total number of holders that can be attached to the central holding device 1206 is increased from six holders (as described in FIG. 11) to twelve holders. In this embodiment, each of the holders 1200 corresponds to the holders 1100 described in FIG. 11. In various embodiments, the dimension of the central holding device 1206 may be enlarged to hold more than two movable clips 1200 on each side. In addition, depending on the size and shape of the central holding device 1206, one or more holders 1200 may be coupled to corners of the hexagon-shaped central holding device 1206. The central holding device 1206 may thus be capable of holding more than twelve holders 1200.

In some embodiments, the dimension of the central holding device 1206 may be adjustable. In some embodiments, the dimension of the central holding device 1206 may be adjusted automatically, e.g., with an electrical motor, such as stepper motor, that operates a mechanical expander that increases or decreases the dimension of the central holding device. In this condition, a controller may control the stepper motor to precisely change the dimension of the central holding device 1206, and consequently increase or decrease the capacity of the central holding device 1206 for holding different numbers of the holders.

In view of the foregoing disclosure, a variety of additional embodiments are apparent, as illustrated by the following examples.

Example 1: An apparatus for holding a plurality of objects, comprising a central holding device and a plurality of holders that are couplable simultaneously to the central holding device, wherein each holder of the plurality of holders includes a movable clip with an aperture through which an object can be inserted and held within the aperture, and a spring that exerts a spring force on the movable clip, wherein the spring force is adjustable for holding the object within the aperture of the movable clip.

Example 2: The apparatus of Example 1, wherein each holder of the plurality of holders further includes a tube having a first end and a second end that is opposite to the first end, wherein the movable clip is at the first end of the tube, and a cap at the second end of the tube, wherein the cap is movable to adjust the spring force of the spring on the movable clip.

Example 3: The apparatus of Example 2, wherein each holder of the plurality of holders further includes a first retainer inside the tube, wherein the first retainer couples the movable clip to the spring, and a second retainer inside the tube, wherein the second retainer couples the cap to the spring.

Example 4: The apparatus of any of Examples 1 to 3, wherein the central holding device includes a periphery to which the plurality of holders are couplable, wherein the periphery includes a plurality of horizontally-oriented coupling apertures configured to couple respective holders of the plurality of holders to the central holding device.

Example 5: The apparatus of any of Example 4, wherein the central holding device further includes one or more vertically-oriented apertures, wherein at least one vertically-oriented aperture of the one or more vertically-oriented apertures is configured to hold an object that supports the central holding device at a fixed position relative to an external instrument.

Example 6: The apparatus of Example 4 or Example 5, wherein the movable clip of a holder includes a fastener that is operable to couple the holder to a respective horizontally-oriented coupling aperture on the periphery of the central holding device.

Example 7: The apparatus of any of Examples 1 to 6, wherein the central holding device is a first central holding device, the apparatus further comprising a second central holding device that is attachable to the first central holding device, wherein each of the first and second central holding devices is configured to couple multiple holders of the plurality of holders.

Example 8: The apparatus of Example 7, wherein the second central holding device includes a periphery to which holders of the plurality of holders are couplable, and wherein the second central holding device is attachable to the first central holding device with a rotational offset relative to the first central holding device.

Example 9: The apparatus of Example 8, wherein the second central holding device includes one or more vertically-oriented apertures that align with one or more vertically-oriented apertures of the first central holding device when the second central holding device is attached to the first central holding device.

Example 10: The apparatus of Example 9, wherein the second central holding device is attached to the first central holding device by one or more fasteners that are vertically retained in corresponding vertically-oriented apertures of the first and second central holding devices.

Example 11: The apparatus of Example 9 or Example 10, wherein at least one vertically-oriented aperture of the first and second central holding devices is configured to hold an object in a center of the first and second central holding devices.

Example 12: The apparatus of any of Examples 1 to 11, further comprising a key structure that includes a key extending from the central holding device or a holder, and a corresponding aperture in the holder or the central holding device configured to receive the key, wherein, when the holder is coupled to the central holding device, the key is received into the corresponding aperture and operates to retain the holder in a particular orientation with respect to the central holding device.

Example 13: A system for holding a plurality of measurement probes, the system comprising a calibration bath and a supporting structure including a vertical column attached to the calibration bath, a cross support that is movable along the vertical column and securable to the vertical column, and a horizontal column that is securable to the vertical column by the cross support, wherein the cross support provides vertical and horizontal positioning of the horizontal column relative to the calibration bath. The system further includes a central holding device coupled to the horizontal column, wherein the central holding device includes one or more vertically-oriented apertures and has a periphery that includes a plurality of horizontally-oriented coupling apertures.

Example 14: The system of Example 13, further comprising a plurality of holders that are couplable simultaneously to the central holding device, wherein each holder of the plurality of holders includes a tube having a first end and a second end that is opposite to the first end and a movable clip at the first end of the tube, wherein the movable clip has an aperture through which an object can be inserted and held within the aperture, a cap at the second end of the tube, a spring inside the tube, a first retainer inside the tube, wherein the first retainer couples the movable clip to the spring, and a second retainer inside the tube, wherein the second retainer couples the cap to the spring, wherein the cap is movable to adjust a spring force of the spring for holding the object within the aperture of the movable clip.

Example 15: The system of Example 14, wherein each holder of the plurality of holders is configured to hold at least one measurement probe of the plurality of measurement probes around the periphery of the central holding device.

Example 16: The system of Example 14 or Example 15, wherein the horizontal column coupled to the central holding device is a holder of the plurality of holders.

Example 17: The system of any of Examples 13 to 16, wherein the central holding device is a first central holding device, the system further comprising a second central holding device that includes one or more vertically-oriented apertures and has a periphery that includes a plurality of horizontally-oriented coupling apertures, wherein the second central holding device is attached to the first central holding device in a stacked configuration, and wherein each of the first and second central holding devices is configured to simultaneously couple multiple holders of a plurality of holders.

Example 18: The system of Example 17, wherein the supporting structure is a first supporting structure and the horizontal column is a first horizontal column, the system further comprising a second supporting structure having a second horizontal column coupled to the second central holding device.

Example 19: The system of Example 18, wherein the first horizontal column coupled to the first central holding device and the second horizontal column coupled to the second central holding device are each a holder of the plurality of holders.

Example 20: The system of any of Examples 17 to 19, wherein at least one vertically-oriented aperture of each of the first and second central holding devices is aligned to hold a measurement probe at the center of the first and second central holding devices, and at least one vertically-oriented aperture positioned to a side of the center is arranged to retain a fastener that attaches the first central holding device to the second central holding device.

The various embodiments described above can be combined to provide yet further embodiments. These and other changes can be made to the embodiments in light of the above-detailed description. In general, in the following claims, the terms used should not be construed to limit the claims to the specific embodiments that are disclosed in the specification and the claims, but should be construed to include all possible embodiments along with the full scope of equivalents to which such claims are entitled.

The invention claimed is:

1. A holder for holding an object, comprising:
 a tube axially extending between a first end and a second end that is opposite to the first end;
 a movable clip at the first end of the tube, the movable clip being axially slidable over an outer surface of the tube between a retracted position and an extended position, wherein in the extended position the movable clip is positioned axially outward from an end surface at the first end of the tube, and wherein the movable clip has an aperture through which the object can be inserted and held within the aperture; and
 a spring inside the tube, wherein the spring is coupled to the movable clip,
 wherein when the movable clip is moved toward the extended position, the spring exerts a spring force that biases the movable clip toward the retracted position, and when the object is inserted into the aperture and the movable clip is moved toward the retracted position, the object is held within the aperture in contact with the end surface at the first end of the tube and an inner surface of the aperture.

2. The holder of claim 1, further comprising a cap at the second end of the tube, wherein the cap is rotatable to adjust the spring force of the spring.

3. The holder of claim 1, wherein the spring force exerted by the spring pulls the inner surface of the aperture toward the end surface at the first end of the tube.

4. The holder of claim 2, further comprising:
 a first retainer inside the tube, wherein the first retainer couples the movable clip to the spring; and
 a second retainer inside the tube, wherein the second retainer has a first end coupled to the cap and a second end that engages the spring.

5. The holder of claim 4, wherein:
 the spring includes a helical coil;
 the second end of the second retainer has at least one tooth that extends between adjacent turns of the helical coil; and
 the at least one tooth is configured to travel along the helical coil when the cap is rotated, causing an increased or decreased number of turns of the helical coil to be retained by the second retainer.

6. The holder of claim 4, wherein:
the spring includes a helical coil;
the first retainer has a first end coupled to the movable clip and a second end that engages the spring;
the second end of the first retainer has at least one tooth that extends between adjacent turns of the helical coil; and
the at least one tooth is configured to travel along the helical coil to increase or decrease number of turns of the helical coil retained by the first retainer.

7. The holder of claim 1, further comprising a pin coupled to the tube, wherein the pin extends into a groove defined in the movable clip to guide movement of the movable clip along the tube.

8. The holder of claim 1, further comprising a pin coupled to the movable clip, wherein the pin extends through a groove defined in the tube and couples the movable clip to a first retainer inside the tube, wherein the first retainer couples the movable clip to the spring.

9. The holder of claim 8, wherein the pin passes through the first retainer and prevents rotation of the first retainer relative to the tube.

10. The holder of claim 1, wherein an inner surface of the aperture is shaped to direct the object to a consistent position within the aperture when the object is inserted into and held within the aperture.

11. A method for holding an object by a holder configured according to claim 1, comprising:
moving the movable clip of the holder relative to the tube of the holder from the retracted position toward the extended position, the aperture of the movable clip being configured to hold the object when the object is inserted into the aperture and the movable clip is released;
inserting the object in the aperture when the movable clip has been moved toward the extended position; and
releasing the movable clip to hold the object in the aperture, wherein the spring inside the tube has a first end coupled to the movable clip at the first end of the tube and a second end coupled to a cap at the second end of the tube, and wherein releasing the movable clip causes the movable clip to hold the object in the aperture between the end surface at the first end of the tube and the inner surface of the aperture.

12. The method of claim 11, further comprising rotating the cap to adjust the spring force that the spring inside the tube exerts on the movable clip.

13. The method of claim 12, wherein rotating the cap causes at least one tooth of a retainer coupled to the cap to travel between adjacent turns of a helical coil forming the spring, the at least one tooth causing an increased or decreased number of turns of the helical coil to be retained by the retainer.

14. The method of claim 11, further comprising rotating the spring to cause at least one tooth of a retainer coupled to the movable clip to travel between adjacent turns of a helical coil forming the spring, the at least one tooth causing an increased or decreased number of turns of the helical coil to be retained by the retainer.

15. The method of claim 11, wherein an axial movement distance of the movable clip between the retracted position and the extended position is determined by a length of a groove defined in the tube.

16. The method of claim 15, wherein moving the movable clip relative to the tube causes a pin coupled to the movable clip to travel within the groove defined in the tube.

17. A system for holding a measurement probe within a calibration bath, the system comprising:
a supporting structure including:
a vertical column fixed relative to the calibration bath; and
a cross support that is movable along the vertical column and securable to the vertical column; and
a holder that is securable to the vertical column by the cross support, wherein the cross support provides vertical and horizontal positioning of the holder relative to the calibration bath, the holder including:
a tube having a first end and a second end that is opposite to the first end;
a movable clip at the first end of the tube, wherein the movable clip is movable between a retracted position and an extended position, and in the extended position the movable clip is positioned axially outward from the first end of the tube;
a cap at the second end of the tube;
a spring inside the tube, wherein the spring is coupled to the movable clip, and when the movable clip is moved toward the extended position, the spring exerts a spring force that pulls the movable clip toward the retracted position;
wherein the movable clip has an aperture through which the measurement probe can be inserted and held within the aperture, and
wherein the cap is movable to adjust the spring force of the spring for holding the measurement probe within the aperture.

18. The system of claim 17, further comprising:
a first retainer inside the tube, wherein the first retainer couples the movable clip to the spring; and
a second retainer inside the tube, wherein the second retainer couples the cap to the spring,
wherein the cap is rotatable to adjust the spring force of the spring.

19. The system of claim 18, wherein the spring includes a helical coil, and the spring force of the spring is adjustable by at least one tooth within the tube that extends between adjacent turns of the helical coil and travels along the helical coil to increase or decrease a number of turns of the helical coil that exerts the spring force on the movable clip.

20. The system of claim 19, wherein the aperture has an inner surface shaped to direct the measurement probe to a consistent position within the aperture when the measurement probe is inserted into and held within the aperture.

* * * * *